US008235296B2

(12) United States Patent  
Idaka

(10) Patent No.: US 8,235,296 B2
(45) Date of Patent: Aug. 7, 2012

(54) METHOD OF AND SYSTEM FOR SETTING LASER PROCESSING CONDITIONS, LASER PROCESSING SYSTEM, COMPUTER PROGRAM FOR SETTING LASER PROCESSING CONDITIONS, COMPUTER READABLE MEDIUM AND RECORDING DEVICE ON WHICH LASER PROCESSING CONDITIONS ARE RECORDED

(75) Inventor: Mamoru Idaka, Osaka-fu (JP)

(73) Assignee: Keyence Corporation, Osaka (JP)

( * ) Notice: Subject to any disclaimer, the term of this patent is extended or adjusted under 35 U.S.C. 154(b) by 947 days.

(21) Appl. No.: 11/769,131

(22) Filed: Jun. 27, 2007

(65) Prior Publication Data

US 2008/0011854 A1 Jan. 17, 2008

(30) Foreign Application Priority Data

Jun. 28, 2006 (JP) ................................. 2006-178822

(51) Int. Cl.
*G06K 19/00* (2006.01)
(52) U.S. Cl. ................ 235/487; 219/121.6; 219/121.62; 219/121.64; 219/121.68; 235/462.01; 606/5
(58) Field of Classification Search .............. 235/462.01
See application file for complete search history.

(56) References Cited

U.S. PATENT DOCUMENTS

| 4,864,112 | A | * | 9/1989 | Imai et al. ................. 235/462.01 |
| 4,978,202 | A | | 12/1990 | Yang |
| 5,001,718 | A | | 3/1991 | Burrows et al. |
| 5,067,086 | A | | 11/1991 | Yamazaki et al. |
| 5,646,765 | A | | 7/1997 | Laakmann et al. |
| 5,660,747 | A | * | 8/1997 | Drouillard et al. ....... 219/121.69 |
| 5,751,436 | A | | 5/1998 | Kwon et al. |
| 5,864,114 | A | | 1/1999 | Fukuda |
| 5,897,797 | A | * | 4/1999 | Drouillard et al. ....... 219/121.68 |
| 6,043,452 | A | | 3/2000 | Bestenlehrer |
| 6,180,914 | B1 | | 1/2001 | Jones et al. |
| 6,210,401 | B1 | | 4/2001 | Lai |
| 6,325,792 | B1 | | 12/2001 | Swinger et al. |

(Continued)

FOREIGN PATENT DOCUMENTS

JP 62263889 11/1987

(Continued)

OTHER PUBLICATIONS

Office Action issued by the U.S. Patent and Trademark Office in corresponding U.S. Appl. No. 11/585,356 dated Nov. 9, 2010 (22 pages).

(Continued)

*Primary Examiner* — Thien M. Le
*Assistant Examiner* — Christopher Stanford
(74) *Attorney, Agent, or Firm* — Kilyk & Bowersox, P.L.L.C.

(57) ABSTRACT

A laser method of printing a pattern on works which is read at a high read rate by optical readers and a system for implementing the laser processing method are described. Print pattern data is generated based on printing conditions including at least an original print pattern such as a character string that are specified by users and then converted into data representing an actual print pattern to be actually printed on works according to a three dimensional profile of the works so that an orthogonal projection of that actual print pattern is identical with the original print pattern.

16 Claims, 29 Drawing Sheets

U.S. PATENT DOCUMENTS

| | | |
|---|---|---|
| 6,344,625 B1 | 2/2002 | Kim et al. |
| 6,438,445 B1 | 8/2002 | Yoshida et al. |
| 6,469,729 B1 * | 10/2002 | Ryan .............................. 347/248 |
| 6,483,071 B1 | 11/2002 | Hunter et al. |
| 6,552,300 B1 | 4/2003 | Kerner |
| 6,594,926 B1 | 7/2003 | Wujciga |
| 6,617,544 B1 | 9/2003 | Tsukamoto et al. |
| 6,888,542 B1 | 5/2005 | Clauss |
| 7,069,108 B2 | 6/2006 | Saarela et al. |
| 7,380,717 B2 * | 6/2008 | Lubow .................... 235/462.01 |
| 2001/0031960 A1 * | 10/2001 | Kliewer et al. .................. 606/5 |
| 2001/0044668 A1 | 11/2001 | Kimbrough et al. |
| 2003/0057609 A1 | 3/2003 | Ratcliffe |
| 2005/0049500 A1 | 3/2005 | Babu et al. |
| 2005/0205781 A1 | 9/2005 | Kimba |
| 2006/0066877 A1 | 3/2006 | Benzano |
| 2006/0089747 A1 | 4/2006 | Sakai |
| 2006/0118733 A1 | 6/2006 | Kiyohara et al. |
| 2006/0180582 A1 | 8/2006 | Andreasch et al. |
| 2006/0228525 A1 | 10/2006 | Dakowski |
| 2007/0086822 A1 * | 4/2007 | Sato .............................. 400/129 |
| 2007/0100492 A1 | 5/2007 | Idaka et al. |
| 2007/0252006 A1 * | 11/2007 | Heck et al. .................... 235/455 |
| 2008/0017619 A1 | 1/2008 | Yamakawa et al. |
| 2008/0023455 A1 | 1/2008 | Idaka et al. |
| 2008/0067251 A1 | 3/2008 | Yoshimoto et al. |

FOREIGN PATENT DOCUMENTS

| | | |
|---|---|---|
| JP | 02198412 | 8/1990 |
| JP | 11028586 | 2/1999 |
| JP | 2000-202655 | 7/2000 |
| JP | 2003136260 | 5/2003 |
| JP | 2005175566 A | 6/2005 |
| JP | 2006007257 A | 1/2006 |
| WO | WO 2005046926 * | 5/2005 |
| WO | WO 2005046926 A1 * | 5/2005 |
| WO | 2006061959 A1 | 6/2006 |

OTHER PUBLICATIONS

Office Action issued by the U.S. Patent and Trademark Office in corresponding U.S. Appl. No. 11/770,104 dated Dec. 17, 2010 (26 pages).

Office Action issued by the U.S. Patent and Trademark Office in corresponding U.S. Appl. No. 11/828,505 dated Feb. 7, 2011 (15 pages).

Office Action issued by the U.S. Patent and Trademark Office in corresponding U.S. Appl. No. 11/585,356 dated Sep. 25, 2008 (14 pages).

Office Action issued by the U.S. Patent and Trademark Office in corresponding U.S. Appl. No. 11/585,356 dated Jun. 8, 2009 (15 pages).

Office Action issued by the U.S. Patent and Trademark Office in corresponding U.S. Appl. No. 11/585,356 dated Mar. 16, 2010 (18 pages).

Office Action issued by the U.S. Patent and Trademark Office in corresponding U.S. Appl. No. 11/770,104 dated Sep. 17, 2009 (17 pages).

Office Action issued by the U.S. Patent and Trademark Office in corresponding U.S. Appl. No. 11/770,104 dated May 26, 2010 (16 pages).

Office Action issued by the U.S. Patent and Trademark Office in corresponding U.S. Appl. No. 11/855,448 dated Jun. 23, 2009 (16 pages).

Office Action issued by the U.S. Patent and Trademark Office in corresponding U.S. Appl. No. 11/855,448 dated Mar. 10, 2010 (15 pages).

Office Action issued by the U.S. Patent and Trademark Office in corresponding U.S. Appl. No. 11/770,104 dated Aug. 12, 2011, nineteen pages.

Office Action received in related U.S. Appl. No. 11/855,448 dated Apr. 5, 2012 (30 pages).

* cited by examiner

METHOD OF AND SYSTEM FOR SETTING LASER PROCESSING CONDITIONS, LASER PROCESSING SYSTEM, COMPUTER PROGRAM FOR SETTING LASER PROCESSING CONDITIONS, COMPUTER READABLE MEDIUM AND RECORDING DEVICE ON WHICH LASER PROCESSING CONDITIONS ARE RECORDED

BACKGROUND OF THE INVENTION

1. Filed of the invention

The present invention relates to a method of and a system for setting processing conditions of a laser processing system such as a laser marker which performs processing such as printing or marking including characters, symbols and graphics on work with a laser beam, a computer program for setting processing conditions for a laser processing system, a computer-readable recording medium or device on which laser processing conditions are recorded.

2. Description of Related Art

A laser processing system scans a given scan field of a subject surface of works (work surfaces) such as components and finished products with a laser beam to apply processing, such as printing and marking of characters, symbols and/or graphics, to the work surfaces. Referring to FIG. 1 for the purpose of providing a brief description of a configuration of a laser processing system by way of example, the laser processing system comprises a laser control unit 1, a laser output unit 2 and an input unit 3. Excitation light generated by a laser excitation device 6 of the laser control unit 1 excites a laser medium 8 of a laser oscillator 50 of the output unit 2. A laser beam L emanating from the laser medium 8 is expanded in beam diameter by a beam expander 53 and directed toward a scanning head 9. The scanning head 9 deflects the laser beam L so as to scan a work W in a given scan field, thereby processing, e.g., marking or printing, the work W.

There laser processing system is used to print symbols such as barcodes and two dimensional codes besides characters and numerals not only on plane work surfaces but on curved work surfaces. However, when reading such a print pattern on a curved work surface by an optical barcode reader, an optical 2D code reader or an image recognition equipment, a read rate of such an optical reader deteriorates due to deformation of the print pattern which occurs according to an occurrence of an angle of an optical axis of the optical reader with a normal to the work surface. This is because an image that the optical reader reads is an orthogonal projection of the print pattern thereto. Specifically, in the case of a barcode print that is printed on a columnar work surface W in circumferential direction as shown in FIG. 2, bars and spaces that the optical reader reads have distortion which becomes larger as the bars come father away from an optical axis of the optical reader. In consequence, narrow spaces and pitches of the narrow spaces between bars of the barcode become relatively smaller as the bars come farther away form an optical axis of the optical reader. If an angle of the optical axis of the optical reader with a normal to a work surface becomes large enough to be measurable, the optical reader encounters read errors. In the case where the angle of the optical axis of the optical reader with a normal to a work surface has an adverse effect on readability of the optical reader, it is essential to change a layout of a barcode on the columnar work surface so as thereby to make distortions of the barcode as small as possible. That is, it is necessary to print the barcode on the columnar work surface in a lengthwise direction as shown in FIG. 3. However, many objects or work surfaces impose constrains on printing areas, which is of a major problem in the laser processing system.

SUMMARY OF THE INVENTION

It is therefore an object of the present invention to provide a method of and a system for laser processing condition setting which enables optical readers to read a processed pattern on three-dimensional work surfaces with an enhanced read rate.

It is another object of the present invention to provide a computer program executing the laser processing condition setting method.

It is further of the present invention to provide a computer-readable recording medium or device on which a laser processing condition setting sequence is written on.

The forgoing and other objects and features of the present invention are accomplished by a laser processing data setting system for setting processing data representing a pattern in which a laser processing system scans a three-dimensional work surface with a laser beam within a working zone to form the pattern readable by an optical reader on the three-dimensional work surface. The laser processing data setting system comprises laser processing condition setting means for setting conditions of laser processing by the laser processing system based on information on characters and/or a symbol constituting the pattern and a three-dimensional profile of the three-dimensional work surface, and data generating means for generating data based on which laser processing system executes laser processing, wherein the data generating means converts the data into processing data representing a processing pattern that is an orthogonal projection of the pattern on the three-dimensional work surface based on the conditions of laser processing.

The laser processing condition setting means may generate the processing data so that an optical axis of the optical reader is in alignment with a normal to the three-dimensional work surface, and besides adjusting an angle of the optical axis of the optical reader with respect to the three-dimensional work surface. The three-dimensional work surface is preferably column-shaped and the laser processing conditions includes either on or both of a curvature radius of the column-shaped three-dimensional work surface and coordinates of a center of a circle as an envelope of the column-shaped three-dimensional work surface. Furthermore, the laser processing conditions include scanline density increasing as an angle of the optical axis of the optical reader with a normal to the columnar work surface becomes larger.

According to another aspect of the present invention, the laser processing system for scanning a three-dimensional work surface with a laser beam within a working zone to form a pattern readable by an optical reader on the three-dimensional work surface. The laser processing system comprises laser generating means for generating a laser beam, scanning means for scanning the three-dimensional work surface with the laser bean within the working zone which comprises a beam expander having a lens system which includes at least two lenses coaxially at an incident side and an exit side, respectively, for varying a focal length of the laser beam by varying a relative distance between the two lenses, a first scan mirror for deflecting the laser beam coming from the beam expander in a first direction to scan the work surface within the working zone in the first direction, an a second scan mirror for deflecting the laser beam reflected by the first scan mirror in a second direction perpendicular to the first direction to scan the work surface within the working zone in the second direction, control means for controlling the laser generating means and the scanning means so as to apply the laser processing to the work surface according to laser processing conditions, processing condition setting means for setting the laser processing conditions by specifying a three-dimensional profile of the work surface and a processing pattern, and data generating means for generating laser processing data for the work surface according to the laser processing conditions wherein the data generating means converts the data into processing data representing a processing pattern that is an orthogonal projection of the pattern on the three-dimensional work surface based on the conditions of laser processing.

According to another aspect of the present invention, the method of setting processing data representing a pattern in which a laser processing system scans a three-dimensional work surface with a laser beam within a working zone to form the pattern readable by an optical reader in the three-dimensional work surface, comprises the steps of setting conditions of laser processing by the laser processing system based on information on the pattern and a three-dimensional profile of the three-dimensional work surface, generating data based on which laser processing system executes laser processing and converting the data into processing data representing a processing pattern that is an orthogonal projection of the pattern on the three-dimensional work surface based on the conditions of laser processing.

According to still another aspect, the computer program for setting processing data representing a pattern in which a laser processing system scans a three-dimensional work surface with a laser beam within a working zone to form the pattern readable by an optical reader on the three-dimensional work surface comprises a function of setting conditions of laser by the laser processing system based on information on the pattern and a three-dimensional profile of the three-dimensional work surface, a function of generating data based on which laser processing system execute laser processing, and a function of converting the data into processing data representing a processing pattern that is an orthogonal projection of the pattern on the three-dimensional work surface based on the conditions of laser processing.

According to a further aspect of the present invention, 17, the computer-readable storage medium carries the computer program as set forth above therein. The computer-readable storage medium include magnetic disks such as CD-ROM, CD-R, CD-RW, a flexible disk, a magnetic tape, DVD-ROM, DVD-RAM, DVD–R, DVD+R, DVD–RW, DVD+RW, Blue-ray, (trade name), FD and DVD; optical disks, magnetic disks, semiconductor memories and other medium capable of storing a computer program. The program include a program that is downloaded through network communications such as an internet, as well as a program stored on the storage medium. The storage medium include dedicated or multipurpose equipments in which the computer program is mounted in a viable state in the form of software or firmware. Processing and functions of the computer program may be executed by program software that a computer executes These functions may further be realized by hardware such as a predetermined gate array such as FPGA and ASIC or in the mixed form of program software and a partial hardware module that realizes hardware partially.

According to the present invention, since an orthogonal projection of a pattern applied even to a tree-dimensional work surface is identical with an original pattern, the optical reader is enabled to read the pattern on the work surface at a high read rate. Furthermore, a pattern can be printed without density gradient by varying or increasing scanline density, the pattern is prevented from declining its readability.

BRIEF DESCRIPTION OF THE DRAWINGS

The foregoing and other objects and features of the present invention will be clearly understood from the following detailed description when reading with reference to the accompanying drawings wherein same or similar parts or mechanisms are denoted by the same reference numerals throughout the drawings and in which.

DETAILED DESCRIPTION IF THE PREFERRED EMBODIMENTS

Figure 1:
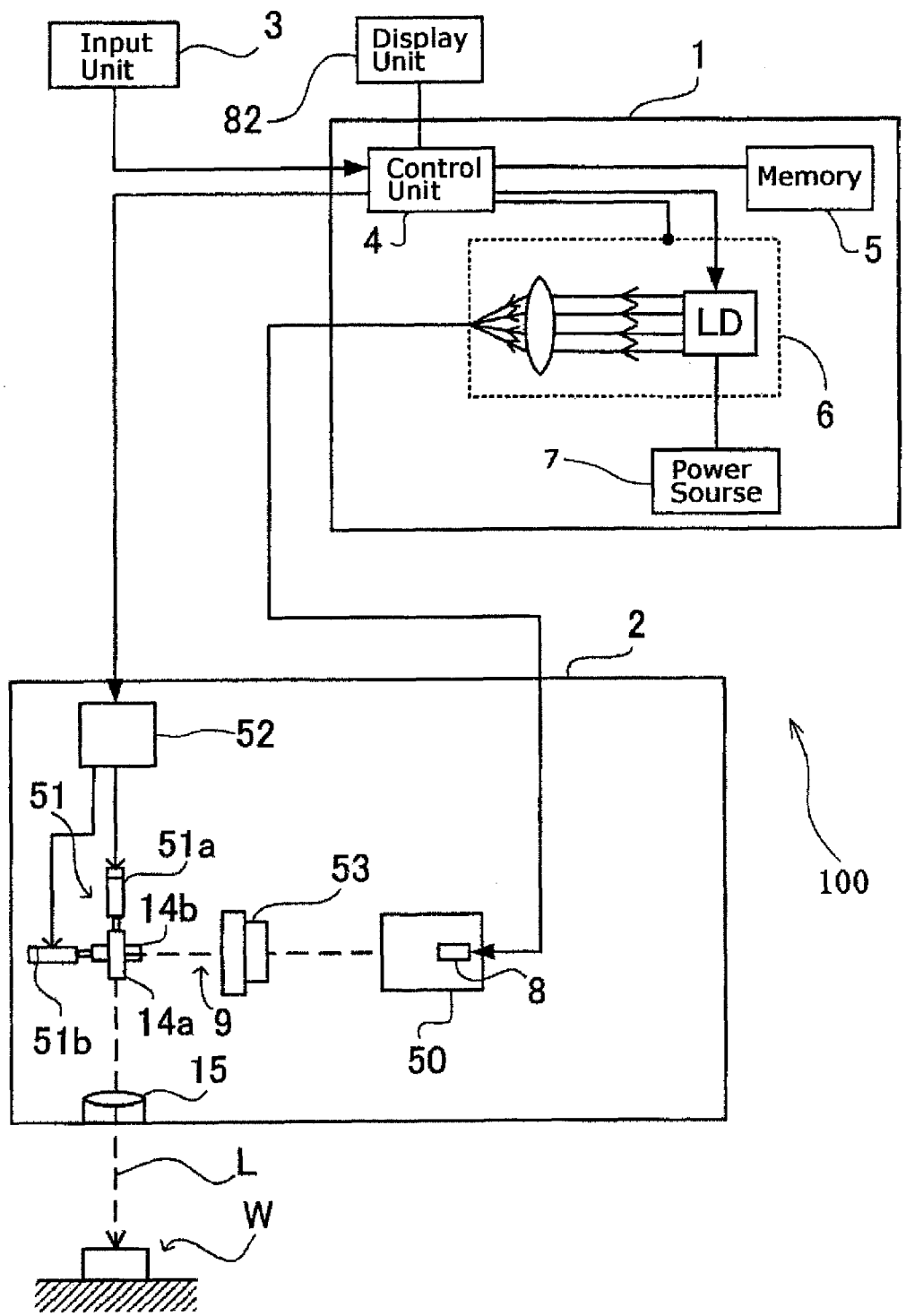
FIG. 1 is a block diagram schematically illustrating a laser processing system according to an embodiment of the present invention.
Figure 2:
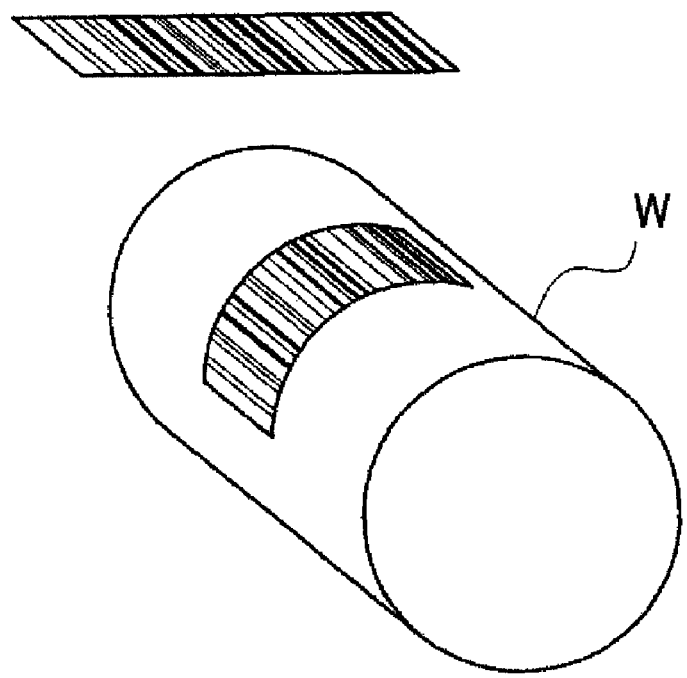
FIG. 2 is a perspective view showing transverse barcode printing on a columnar work surface.
Figure 3:
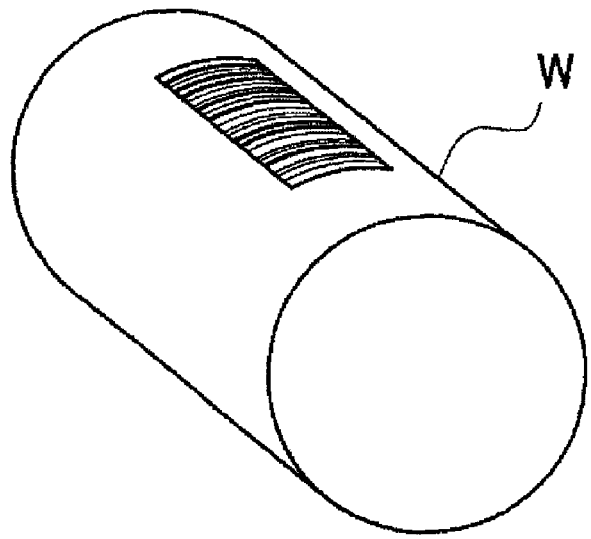
FIG. 3 is a perspective view showing longitudinal barcode printing a columnar work surface.

Hereinafter, embodiments of the present invention will be concretely described with reference to the accompanying drawings, Although the following description is directed to a method of and a system for setting processing such as printing or marking including characters, symbols and graphics on work with a laser beam, a computer program for setting processing conditions for a laser processing conditions are recorded, nevertheless, the it should be appreciated that the present invention has broader applications and is not limited to this particular embodiments.

Further, in the following description, various changes and modifications may be made in the form, size, relative arrangement of constituent components and means of the described system and apparatus unless otherwise specified distinctively. It is intended that all matter contained in the description and as shown in the accompanying drawings shall be interpreted as illustrative and not in a limiting sense unless otherwise specified distinctively. The same or similar components or means of the described system and apparatus in the accompanying drawings are referred by the same names and denoted by the same or similar reference numerals. Some components and means of the described system and apparatus are illustrated with exaggeration for clear understanding in the accompanying drawings. Further, some components and means of the described system and apparatus may be formed in the form of an integral part, or vice versa.

In the following description, "connection" of the laser processing system to a computer, a printer, external memory devices and other peripheral equipments which are used for operating, controlling, inputting and outputting information or data to and displaying information or data on the laser processing apparatus is made by means of electrical communication through wired connection such as serial connection, parallel connection or a network. Examples of the serial connection include IEEE1394, RS-232x, RS-422, RS-423, RS-485, USB, PS2 and the like, Examples of the network includes 10BASE-T, 100BASE-TX, 1000BASE-T and the like. The connection is not limited to wired connection and may be of wireless connection, including a wireless LAN such as IEEE802, 1x and OFDM, and radio frequency communication, infrared communication or optical communication such as Bluetooth (trademark). The memory device for storing data of an object and setting of the system or apparatus may be any processor-readable medium, including but not limited to a memory card, a magnetic disk, an optical disk, a magnetic optical disk, a semiconductor memory, etc. and any combination of the two or more of the foregoing.

Although a laser marker is exemplified as a typical laser processing system of the present invention by way of example, nevertheless, the present invention is suitable for use on all types of laser-assisted processing systems or apparatus including laser oscillators, laser processing devices for boring, marking, trimming, scribing, surface finishing, light source devices such as a light source for read and write of high-density optical disk such as DVD and Blue-ray (trademark), a light source for a laser printer, an illumination lit source, a light source for a display equipment, and various medical equipments. Further, in the following embodiment, the laser marker is described as used for printing. However, the present invention is suitable for use on all types of laser-assisted processing, including fusion or exfoliation of a subject surface, surface oxidization, surface shaving, discoloring and the like.

As utilized hereinafter, the term "printing" shall mean and refer to printing or marking of characters, symbols and graphics, and besides any processing described above. The term "processing pattern" or "print pattern" as used herein shall mean and refer to various characters or letters, numerical characters, graphics, signs, pictorial symbols, icons, logos, barcodes, two-dimensional codes, or combinations of two or more of them, In particular, the term "character" and "symbol" as used herein shall mean and refer to optically readable characters and symbols. Examples of the two-dimensional code, stack type or matrix type, include a QR code, a micro QR code, a data matrix or data code, a Veri code, and Aztec code, PDF417, a Maxi code, a composite code, an RSS (Reduced Space Symbology) code such as RSS14, RSS Stacked, RSS Limited, RSS Expanded, etc. The composite code, which is a composition of a bar code and a two dimensional code, is known in various combinations such as a combination of a barcode and a micro QR code. There are two types of two dimensional codes, i.e. stacked type and a matrix type, any one of which is available in the present invention.

Referring to the accompanying drawings in detail, and in particular, to FIG. 1 showing a laser processing system 100 in accordance with an embodiment of the present invention, the laser processing system 100 comprises a laser control unit 1, a laser output unit 2 and input unit 3. The input unit 3 is connected to the laser control unit 1 through which information necessary to set job control data of the laser output unit 2 is entered and sent to the laser control unit 1. The setting information includes operating conditions of the laser output unit 2, making job information such as a print pattern to be printed on a work surface and the like. The input unit 3 is a console including a keyboard and a mouse. In order to check up on settings, a display unit 82 such as an LCD device or a CRT may be provided to display the setting information entered through the input unit 3 for checking. A touch panel is available for a terminal device serving both as an input device and a display.

The laser control unit 1 comprises at least a controller 4, a memory device 5, a laser excitation unit 6 and a power source 7. The data of setting are inputted by the input unit 3 and sent to the controller 4 is stored in a data storage medium of the memory device 5. The controller 4 reads out data representing the settings from the data storage medium of the memory device 5 as needed to drive the laser excitation unit 6 for excitation of a laser medium 8, such as a laser rod, of the laser output unit 2 according to control signals representing a processing pattern such as a mark or a text to be printed. The data storage medium may be a built-in memory, preferably a semiconductor memory such as RAM or ROM. The storage medium may be of a removable type such as a semiconductor memory card including a PC card and a SD card or a memory card including a hard disk. When the memory device 5 comprises a memory card is able to be easily rewritten by an external equipment such as a computer, data setting is performed without connecting the input unit 3 to the control unit by writing the contents set by a computer in the memory card and placing the memory card in the control unit 1. The laser processing system 100 is quite easily configured with the memory card placed in the memory device 5 without keying in data for desired job control through the input unit 3. Write or rewrite of data in the memory card can be easily carried out by the use of an external equipment such as a computer. It is preferred to employ, in particular, a semiconductor memory in terms of high data read/write rate, vibration-proof structure and prevention of data disappearance due to a crush.

The controller 4 provides scan signals for driving a scanner 9 of the laser output unit 2 through a laser excitation device 6 so as to scan a work surface with a laser beam L. Specifically, the power source 7, which is a constant voltage power source, supplies a specified constant voltage to the laser excitation device 6. The scan signals for controlling a marking or print job of the laser output unit 2 comprise pulse width modulation (PWM) signals corresponding to pulse widths of the laser beam. In this instance, the intensity of laser beam depends on a duty ratio, or on both a frequency and a scanning rate, according to a frequency of the PMW.

Figure 4:
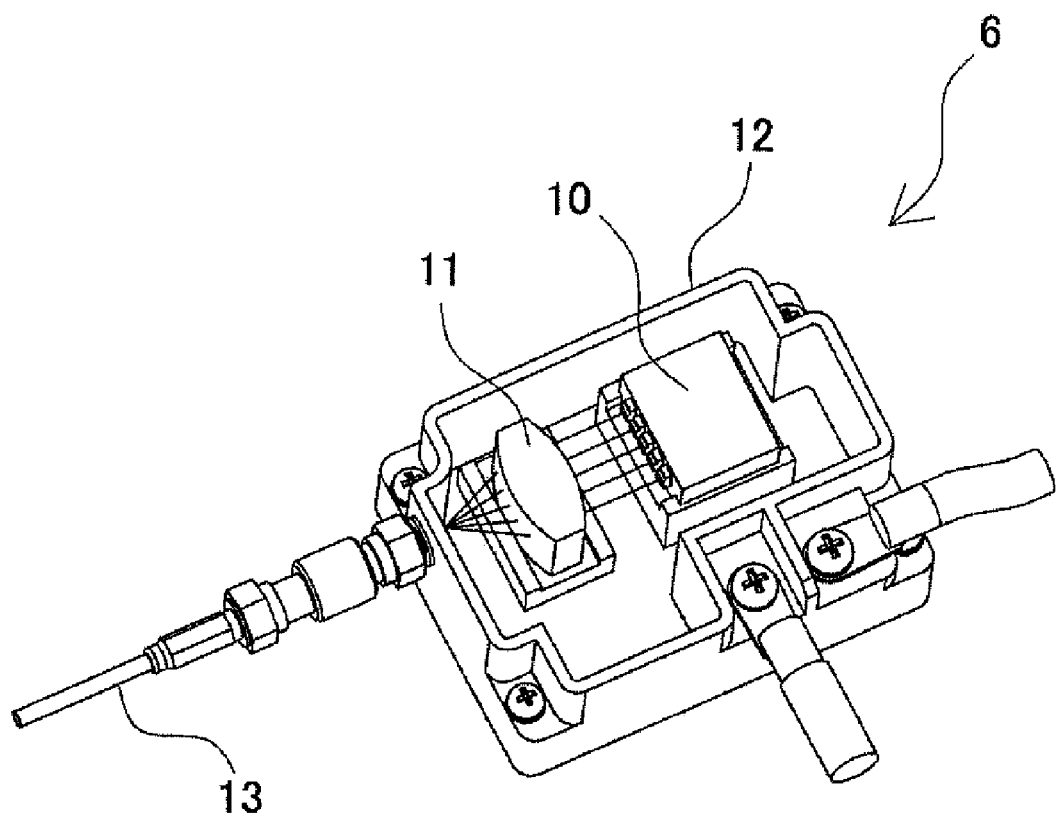
FIG. 4 is a perspective view showing an internal arrangement of a laser excitation unit.

A specifically shown in FIG. 4 by way of example, the laser excitation device 6 comprises a laser excitation light source 10 such as a semiconductor laser or a lamp and a focusing lens system (schematically depicted by a single lens) 11 fixedly installed in a casing 12. This casing 12, which is made of a metal such as brass good at thermal conduction, effectively releases heat generated by the laser excitation light source 10. The laser excitation light source 10 comprises laser diode array made up of a plurality of laser diodes $10a$ arranged in a straight raw. Laser beams emanating from the respective laser diodes $10a$ are focused on an incident end of an optical fiber cable 13 by the focusing lens system 11 and exits as an excitation beam from the optical fiber cable 13. The optical fiber cable 13 is optically connected to the laser medium 8 directly to through a coupling fiber rod (not shown).

The laser output unit 2 includes a laser oscillator schematically shown by a reference numeral 50 for exciting the laser medium 8 with the excitation and oscillating it to generate a laser beam L in what is called an end-pumping excitation method, a scanner 9 for scanning a work surface area three dimensions which will be described in detail in connection with FIGS. 5 to 7 later, and a drive circuit 52 for driving the scanner 9. The scanner 9 comprises Z, Y and Z-axis scanners $14a$, $14b$, and $14c$ which is built in a beam expander 54 and an fΘ lens (not shown). That laser oscillator 50 comprises, in addition to the laser medium 8, an output mirror and a total reflection mirror oppositely disposed at a specific distance, an aperture disposed between these mirror and a Q-switching cell, all of which are arrange in a given path of an induced emission light. The induced emission light from the laser medium 8 is amplified by multiple reflection between the output mirror and the total reflection mirror, switched at a short cycle, selected in mode by the aperture, and then exits as a laser beam L from the laser oscillator 50 through the output mirror. The laser oscillator 50 is known in various forms and may take any form will known in the art. The laser medium 8 used in this embodiment is an Nd:$YVO_4$ solid state laser rod which has absorption spectra whose central wavelength is 809 nm. In order to excite the Nd-$YVO_4$ solid state laser rod, the laser diodes $10a$ are adjusted to emit a laser beam at a wavelength of 809 nm. Solid state laser mediums available for the laser medium 8 include a rare earth-doped YAG, LiCaF, YLF, NAB, KNP, LNP, NYAB, NPP, GGG and the like. It is practical to convert a wavelength of laser beam from the solid state laser medium by the use of a wavelength conversion element in combination with the solid state laser medium. Further, the laser medium 8 is not bounded by a solid state laser medium and it is practicable to use a gas laser such as a carbon dioxide gas laser. It is also practicable to exclude the laser medium 8 by the use of a wavelength conversion element for converting a wavelength of the laser diode $10a$ if the laser excitation light source 10. Available examples of the wavelength conversion element include KTP(KTiP $O_4$); organic non-linear optical mediums and inorganic non-linear optical mediums such as KN($KNbO_3$), KAP($KASpO_4$), BBO and LBO; and bulk type polarizing-inverting element such as LiNb $O_3$, PPLN (Periodically Polled Lithium Niobate), $LiTaO_3$ and the like. Further, it is allowed to use a laser excitation semiconductor laser of an up-conversion type using a fluoride fiber doped with a rare earth such as Ho, Er, Tm, Sm, Nd and the like.

Figure 5:
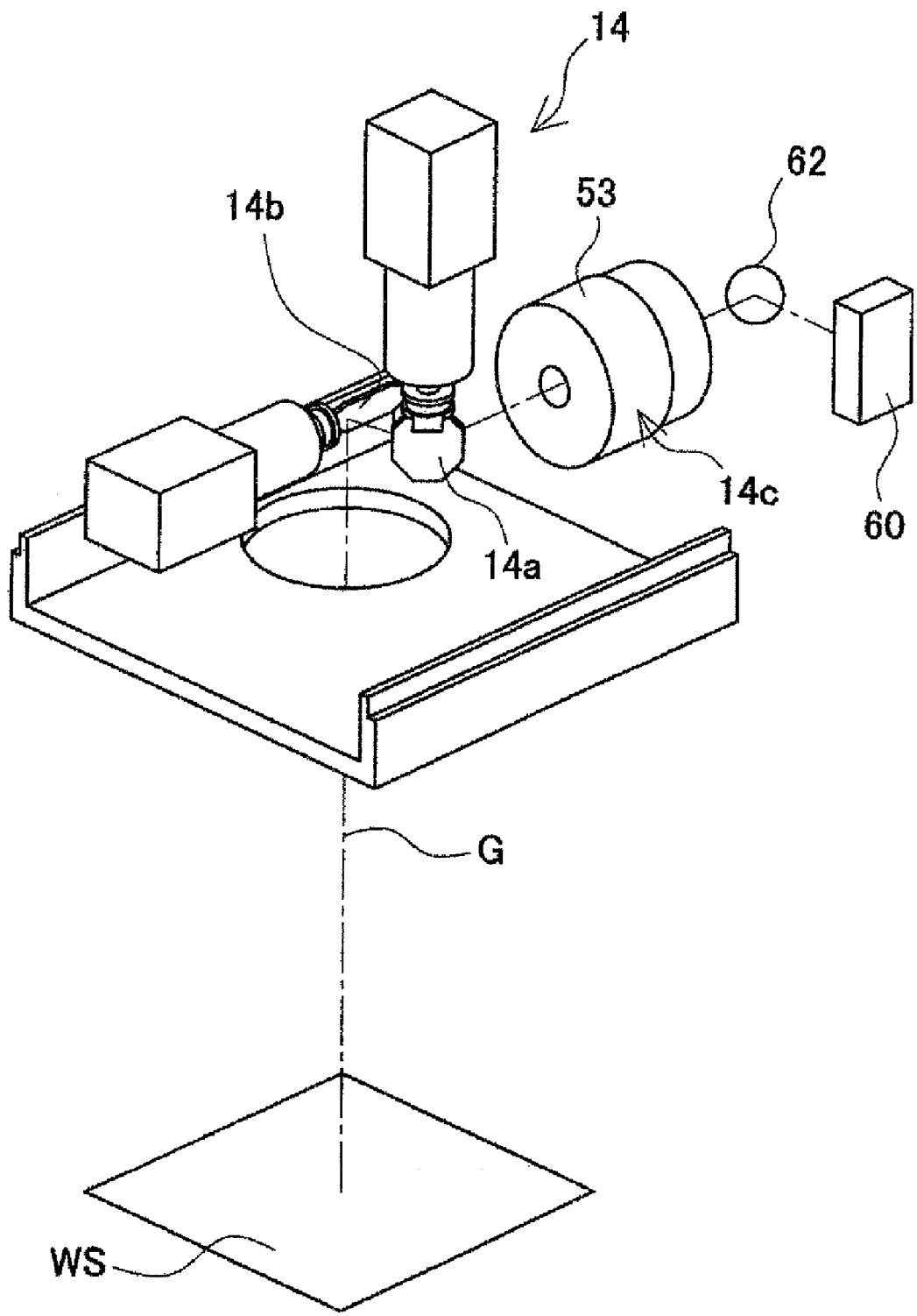
FIG. 5 is a perspective view of a marking head including the laser beam scanner of a laser marketing system according to an embodiment of the present invention.
Figure 6:
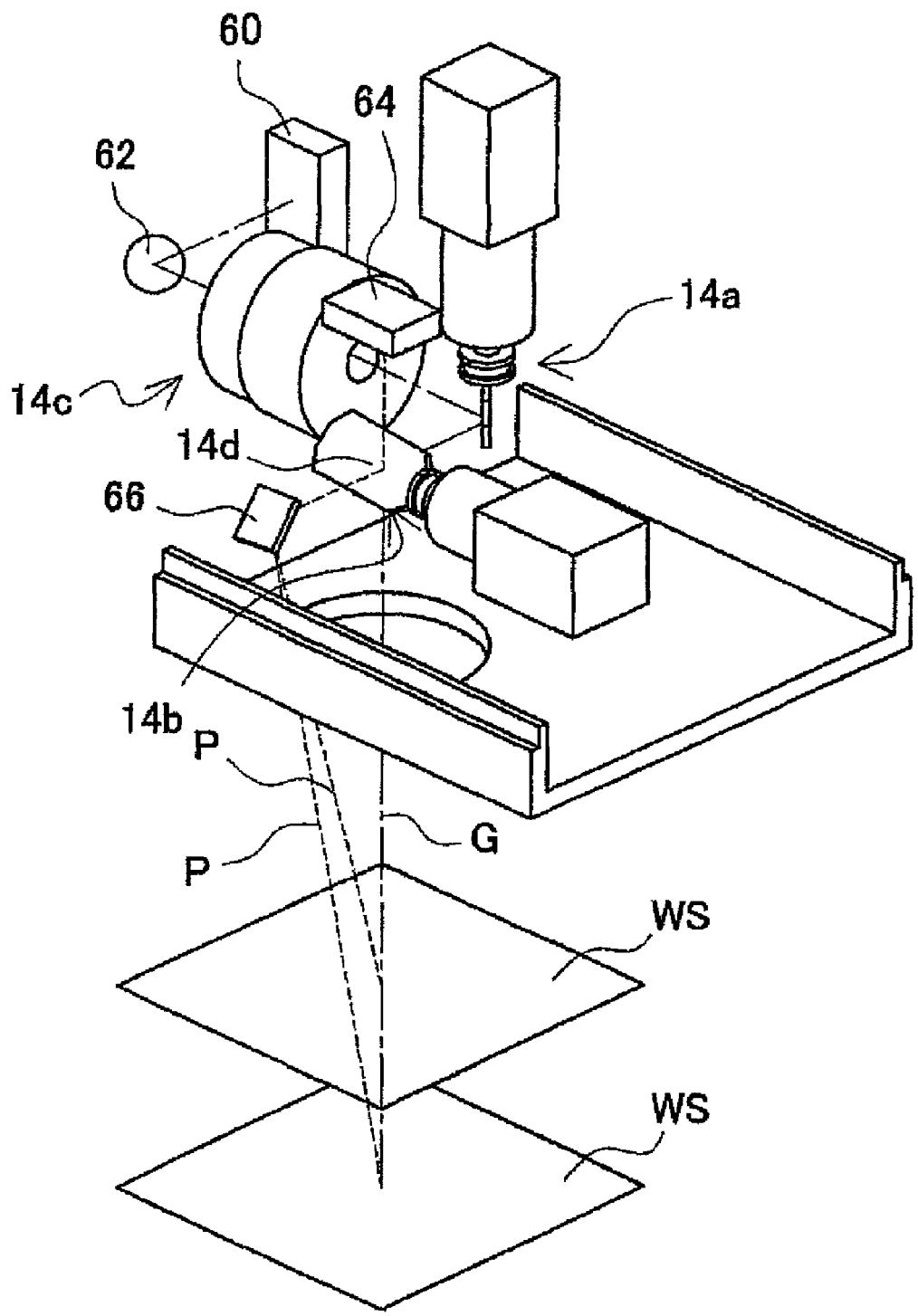
FIG. 6 is a perspective rear view of the marketing head.
Figure 7:
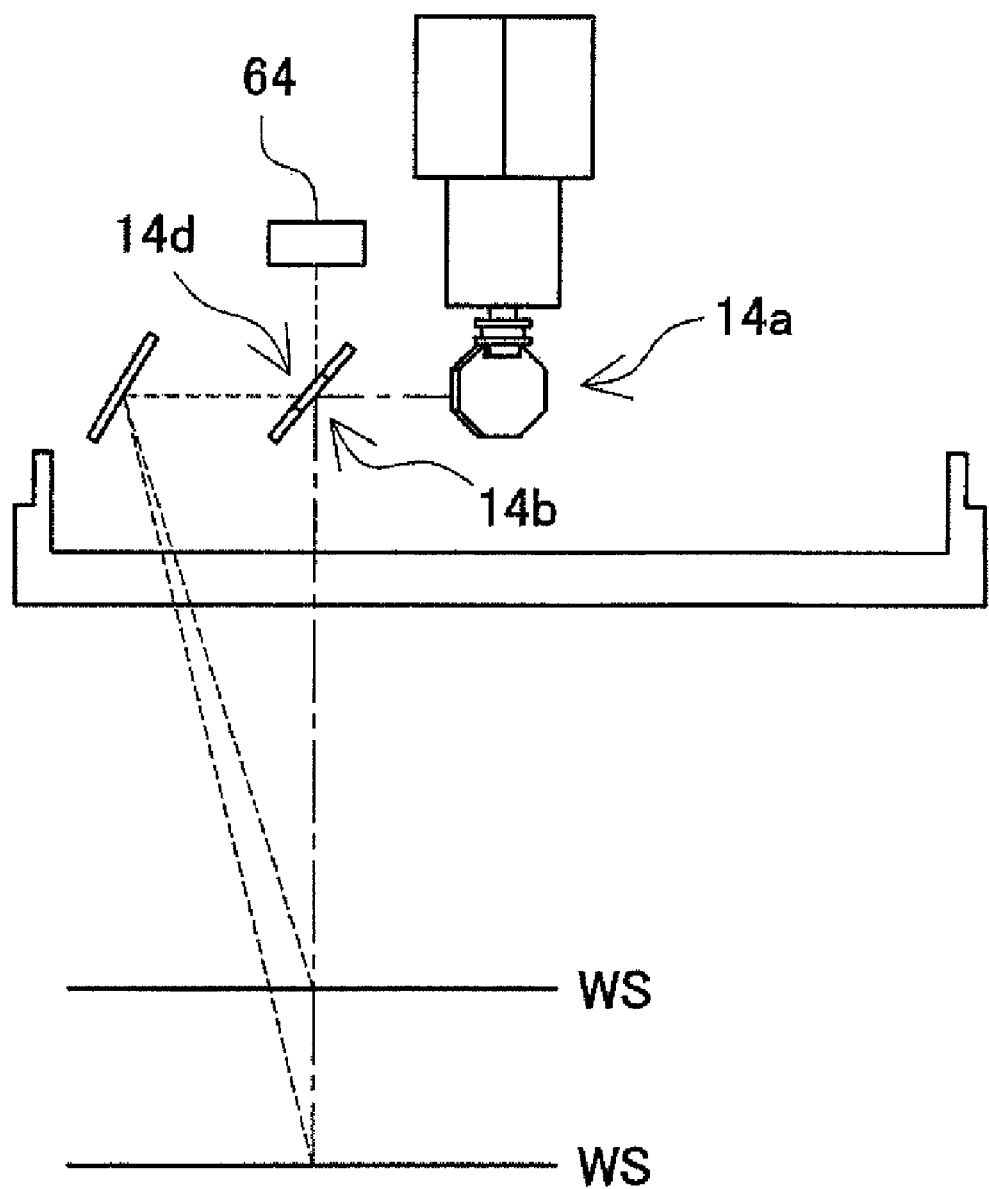
FIG. 7 is a side view of the marketing head.

Referring to FIGS. 5 to 7, the laser scanner 14 comprises an Z-axis scanner $14a$, a Y-axis scanner $14b$ and a Z-axis scanner $14c$ built in a beam expander 53. The beam expander 53 has an optical axis coaxial with the laser beam L emanating from the laser medium 8. The X-axis scanner $14c$ and the Y-axis scanner $14b$ have scanning directions perpendicular to each other. The Z-axis scanner $14c$ has a scanning direction perpendicular to both scanning directions of the X-axis scanner $14c$ and the Y-axis scanner $14b$. The X-axis scanner $14c$ and the Y-axis scanner $14b$ scan a work area WS in tow dimensions with the laser beam L emanating from the laser medium 8. The Z-axis scanner $14c$ scans the work surface area WS in an axial direction with the laser beam L by changing a focal distance of the laser beam L through the beam expander 54. In FIGS. 5 through 7, an fθ lens, which is a focusing lens system, is not shown.

Because the laser processing system focused a laser beam on a working plane by the use of the second mirror, i.e. the Y-axis scanner, it is general to dispose an fθ lens between the second mirror and the working plane so as thereby to make Z-directional correction. Specifically, the fθ lens focuses the laser beam always a plane work surface W. In this embodiment, if a laser marker is required to focus a laser beam with a spot of a diameter less that 50 μm, it is preferred to use such an fθ lens. On the other hand, in the case where a laser marker is required to focus a laser beam with a spot of a diameter greater than 50 μm, which is ordinarily about 100 μm, the Z-direction correction is performed by the expander in place of an fθ lens.

Each of the scanners $14a$, $14b$ and $14c$ is made up of a galvanometer mirror comprising a total reflection mirror and a motor for rotating a reflective surface about an axis of a rotary shaft of the motor. The scanner $14a$, $4b$, $14c$ is provided with a rotational position sensor for detecting a rotational position of a rotary shaft of the motor and providing a signal representing a rotational position of the rotary shaft. The scanner drive circuit 52 (see FIG. 1) drives the X-, F- and Z-axis scanners 14a, 14b and 14c according to control signals provided by the controller 4 of the laser control unit 1. For example, the scanner drive circuit 52 controls drive currents to the respective scanners 14a, 14b and 14c according to control signals provided by the controller 4 of the laser control unit 1. Further, the scanner drive circuit 52 has a function of adjustment of a time rate of rotational angle of the scanner with respect to the control signal. This adjustment function can be embodied by a semiconductor element such as a variable resister operative to change parameters for the scanner drive circuit 52.

Figure 8:
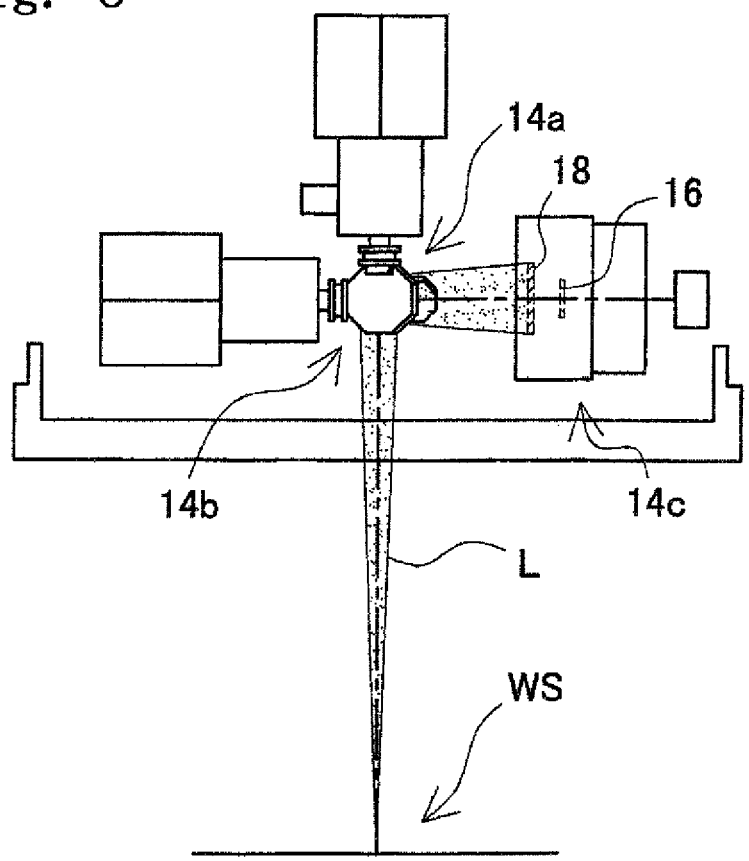
FIG. 8 is a side view of the laser beam scanner with a laser adjusted at a ling focal distance.
Figure 9:
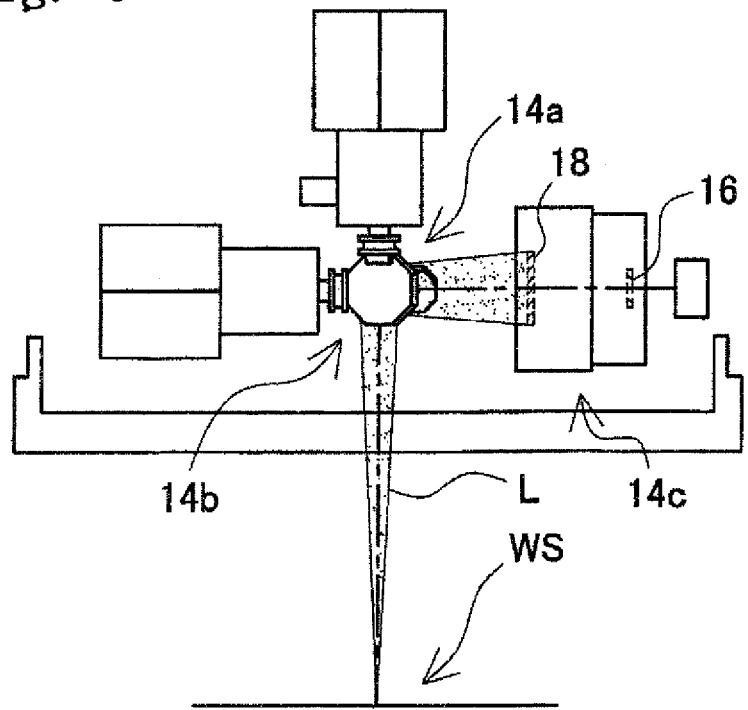
FIG. 9 is a side view of the laser beam scanner with a laser beam adjusted at a short focal distance.
Figure 10A:
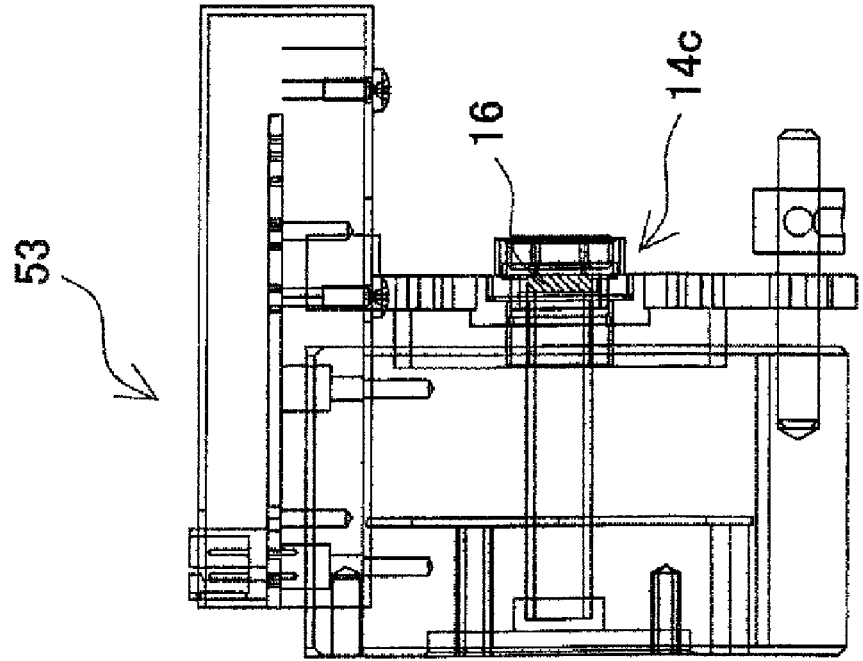
FIGS. 10A and 10B are front and side views of the Z-axis scanner, respectively.
Figure 10B:
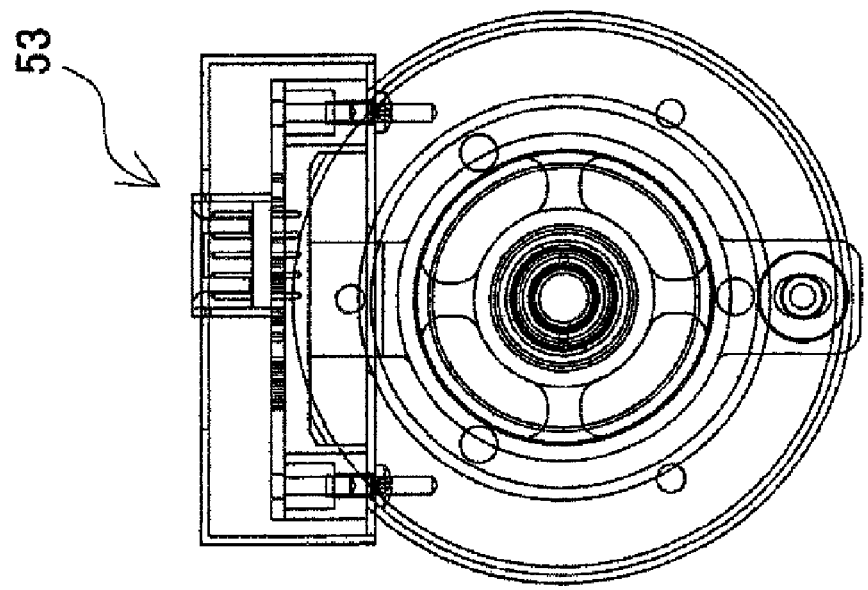

Referring to FIG. 8 to 10, the Z-axis scanner 14c is accompanied by the beam expander 53 which varies a focal length so as to adjust a spot side of the laser beam L on a given work surface area as small as possible. The expander 53, which comprises two lenses or lens groups at incident and exit sides, respectively, varies its focal length by changing a relative axial distance between the two lenses. In other words, the beam expander 53 varies a focal distance (which is hereinafter referred to as a working distance in some cases) at which a least size of beam spot of the laser beam L is formed on a given work surface. In order to effectively vary the focal distance, the beam expander is disposed before the galvanometer mirror of the Z-axis scanner 14c a shown in FIG. 5. In order to provide a more specific explanation, reference is made to FIGS. 8 to 10. As shown, the Z-axis scanner 14c includes a variable-focal length lens system comprising a movable lens or lens group 16 at an incident side and a stationary lens or lens group 18 at an exit side. The movable lens 16 is axially moved back and forth by a driving mechanism including a galvanometer (not shown). The drive mechanism includes a movable element for holding the lens 16 and a coil and magnet assembly for causing axial movement of the movable element. As shown in FIG. 8, when bringing the lenses 16 and 18 close to each other, the variable-focal length lens system changes it focal length longer, so as hereby to make a working distance longer. On the other hand. as shown in FIG. 9, when bringing the lenses 16 and 18 far away from each other, the variable-focal length lens system changes its focal length shorter, so as hereby to make a working distance shorter.

The three-dimensional laser processing system, which is capable processing in a direction of work height, besides in length and breadth, may employ a manner of moving a focusing lens or a manner of moving a laser output unit or a laser processing head itself, in place of the Z-axis scanner adjustment.

The laser scanner 14 shown is FIGS. 5 and 6 is provided with a distance pointer. As shown in FIGS. 5 and 6, the laser scanner 14 is provide a distance pointer which comprises optical axis alignment means comprising a light source 60 for producing a guide beam G and an adjustable beam guide element 62 in the form of a reflective mirror and distance pointing means comprising a light source 64 for producing a pointing beam P and a pointer scanner 4d in the form of a reflective mirror formed on the back of the Y-axis scanner 14b and a stationary mirror 66 for reflecting the pointing beam P toward a working zone. The beam guide element 62 is adjusted so as to bring the guide beam G into alignment with an optical axis of the laser scanner 14. The distance pointer projects a spot of the pointing beam P on a line along the guide bam G for indicating a focal point at which a scan laser beam G into alignment with an optical axis of the laser scanner 14. The distance pointer projects a spot of the pointing beam P on a line along the guide bam G for indicating a focal point at which a scan laser beam should focuses.

Although, in the above embodiment, the laser scanner 14 is enables to perform three-dimensional processing by the use of a focal length or distance adjusting mechanism, it may be permitted to move a work table up and down so as to put a work surface on the work table in a focal plane in which the laser beam focuses. Similarly, the laser scanner may be replaced with a mechanism for moving the work table in X-direction and/or Y-direction. The alteration is suitable for laser processing devices for use with a work table in place of a belt conveyer system.

Figure 11:
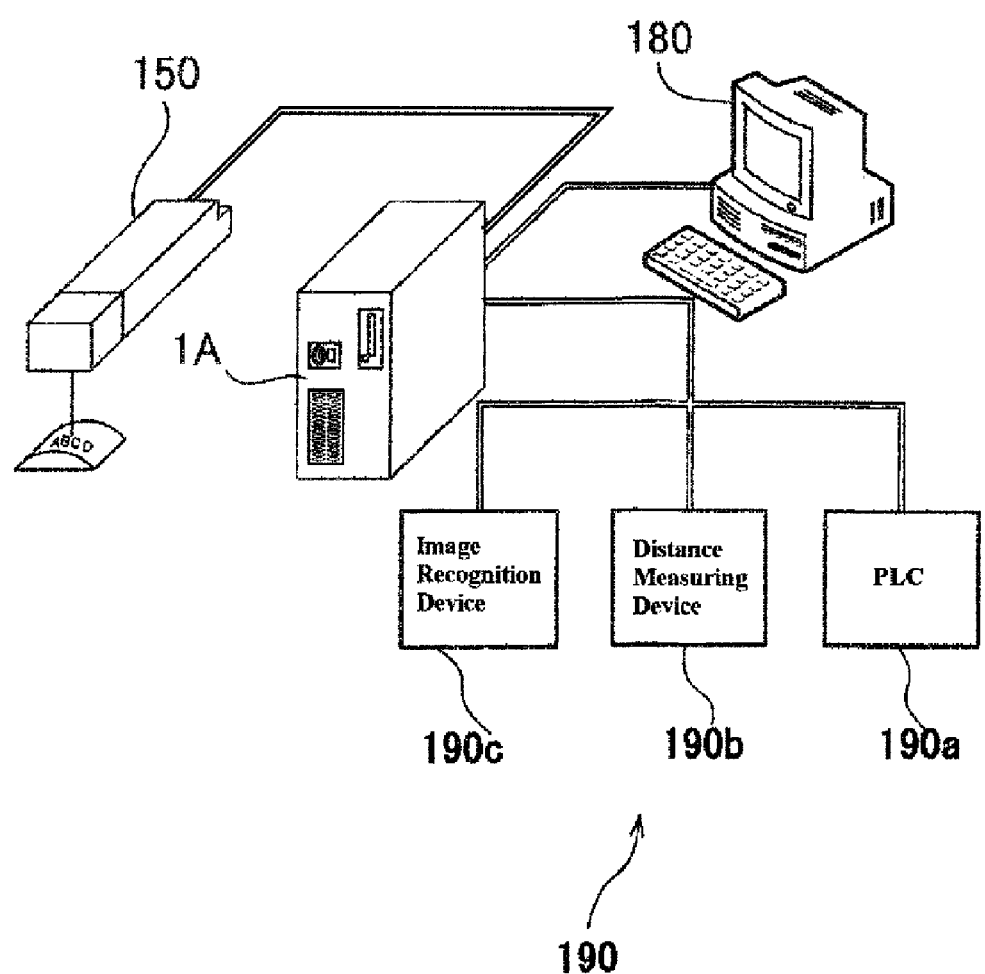
FIG. 11 is a schematic block diagram illustrating a laser marker system capable of printing in three dimensions.

FIG. 11 shows a three-dimensional laser marking system as a laser processing apparatus according to an embodiment of the present invention. The laser marking system comprises at last a laser marking head 150 as a laser output unit, a control unit 1A connected to and controlling the laser marking head 150, and a laser processing data setting system 180 connected to the control unit 1A for data communication with the control unit 1A through which three-dimensional laser processing data representing a print pattern is set to the laser control system 180. In this embodiment, the laser processing data setting system 180 comprises a computer on which a three-dimensional laser processing data setting program is installed. The laser processing data setting system 180 may be comprises by a programmable logic controller (PLC) equipped with a touch panel or other specialized hardware, as well as computer. The laser processing data setting system 180 may be used as an integrated controller for performing the function of laser processing data setting and the function of operation control of a laser processing device such as the laser marking head. Furthermore, the laser processing data setting system 180 may be provided separately from the laser processing device or may be integrated as a single means with the laser processing device. For example, the laser processing data setting system 180 may be provided in the form of a laser processing data setting circuit incorporated into the laser processing device.

The control unit 1A is further connected to external equipment such as a programmable logic controller (PLC) 190a, a distance measuring device 190b and an image recognition device 190c, as well as a photo diode (PD) sensor and other sensors (not shown). The programmable logic controller (PLC) 190a controls the system according to a given sequence logic. The image recognition device 190c, which may comprise an image sensor, detects attributions such as type, position and the like of a work conveyed in a processing line. The distance measuring device 190b, which may be a displacement pickup 190b, acquires information on a distance between a work and the marking head 150. These external equipments are connected to the control unit 1A for data communication.

Figure 12:
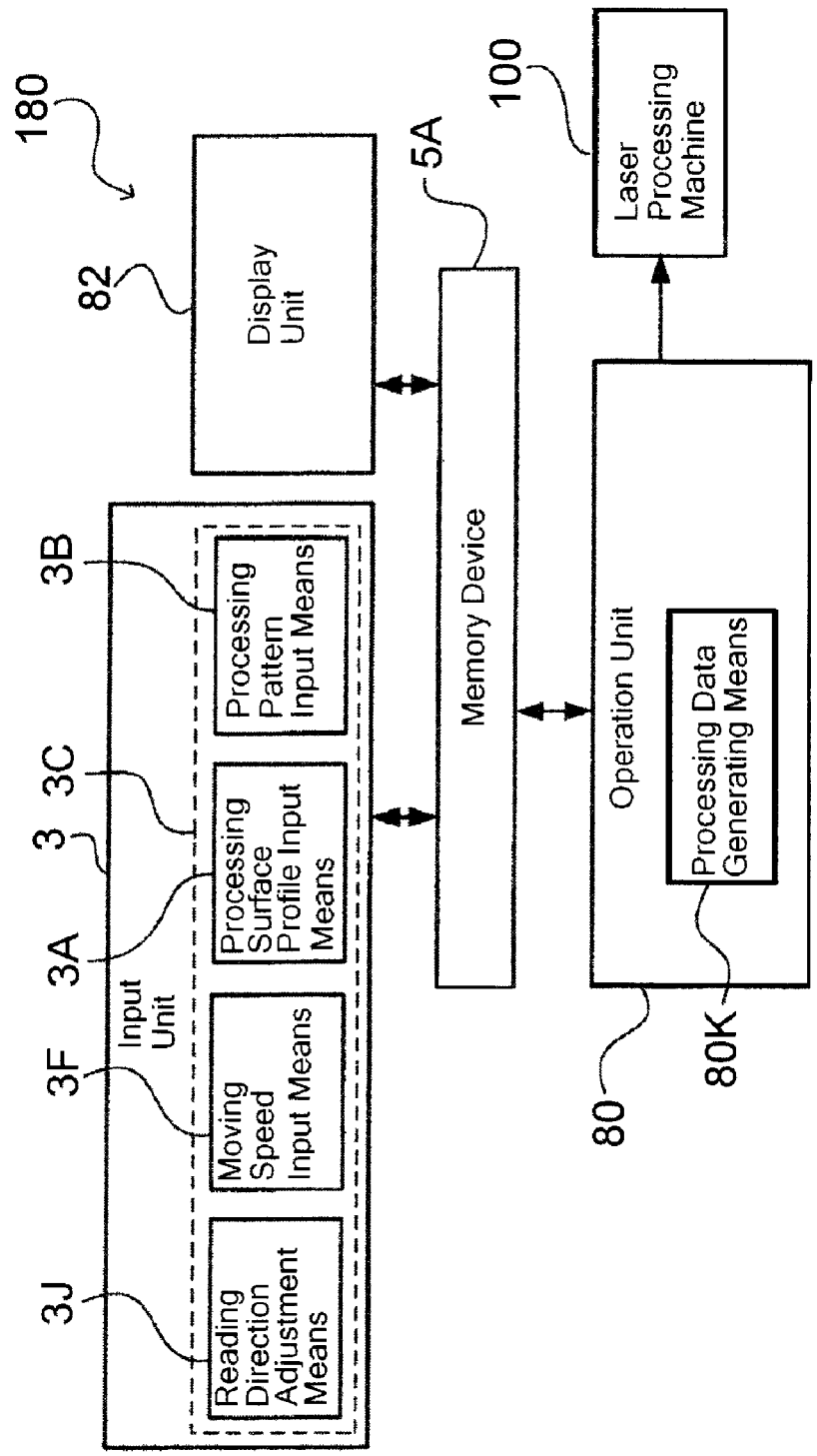
FIG. 12 is a schematic block diagram illustrating a system architecture of a laser processing data setting system.

Referring to FIG. 12 illustrating architecture of the marking data setting system 180 for setting laser marking or printing data to perform printing of a plane print pattern in three dimensions as an example of the laser processing apparatus, the laser processing data setting system 180 comprises an input unit 3 through which information on an intended three-dimensional printing job is entered, an arithmetical and logic unit 80 for generating laser processing or printing data based the information entered through the input unit 3, a display unit 82 for displaying representation of the generated laser printing data, and a memory device 5A for storing the laser printing data, The input unit 3 includes a processing condition setting means 3C for inputting printing conditions necessary to perform given printing in a desired pattern. Specifically, the processing condition setting means 3C comprises a work surface profile input means 3A for inputting information on a profile of three-dimensional work surface, processing pattern input means 3B for inputting information on a process pattern such as a print pattern, a speed input means 3D for inputting a moving speed of work surface and, as appropriate, a reading direction adjusting means 3E for adjusting a direction in which an optical reader reads a print pattern. The memory section 5A, which corresponds to the memory device 5 shown in FIG. 1 and stores data representing the information on a profile of three-dimensional work surface, a given process or print pattern, processing patterns and the like inputted through the input unit 3, may comprise a semiconductor memory, as well as a storage medium such as a fixed storage device. The display unit 82 may be exclusively provided for the three-dimensional laser processing system or may be a monitor of a computer connected to the three dimensional laser processing system.

The arithmetical and logic unit 80 archives the function of the processing data generation means 80K which generates actual processing data. As appropriate, the arithmetical and logic unit 80 may have coordinate conversion means for converting information on a plane processing pattern into a special three-dimensional spatial coordinate data so as to make the processing pattern virtually fit a three-dimensional work surface. The arithmetical and logic unit 80 may be comprised by an integrated circuit such as a large scale integration circuit.

The following description is directed to a sequence of generating a print pattern form character information inputted through the processing condition setting means 3C by means of execution of a laser processing data setting program. In making explanation to the sequence, reference is made to FIGS. 17 through 31 illustrating a user interface window by way of example. In the individual user interface windows, a layout of dialogue boxes, buttons, tab keys and the like of the user interface window may be appropriately changed in location, shape, size, color, pattern and/or the like. The layout of elements of the window may be changed so as to be suitable for clear view, easy assessment and easy judgment. For example, it is not prevented to use a separate window for details setting and/or to open a plurality of windows or dialog boxes incidentally. Operation of buttons and dialog boxes, selection of commands and numerals in boxes are made through the input unit 3 connected to a computer in which the laser processing data setting program is installed. In the following description, the term "press a button" includes pressing a button on physically direct contact with it, clicking a button through the input unit. The input/output device forming the input unit 3 may be unified with the computer, as well as connected to the computer through wireless communication or cable communication. The input/output device may be any commercially available pointing device, including a mouse, a keyboard, a slide pad, a track point, a tablet, a joystick, a console, a jog dial, a digtizer, a light pen, a ten-key keyboard, a touch pad, etc. and may be used not only form management of the program, but also operation of hardware of the laser processing apparatus. Furthermore, it can be made to display a user interface window on a touch screen or a touch panel used as a screen of the display unit 82 so as to enable user to touch the window physically with a finger for buttons operation. It can also be made to use a voice input device or other existing devices, individually or in combination.

Figure 13:
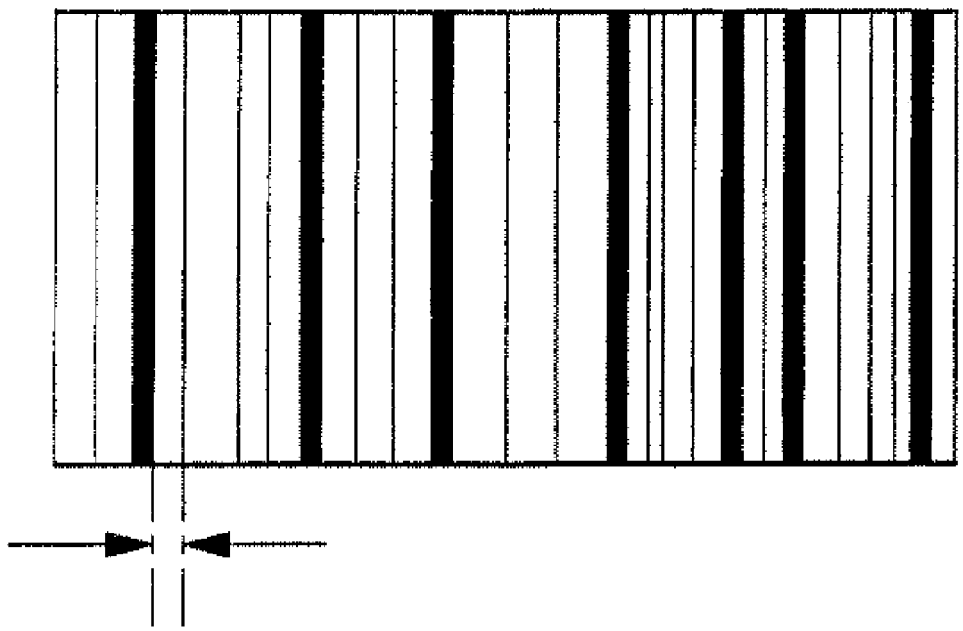
FIG. 13 is a view showing a barcode.
Figure 14A:
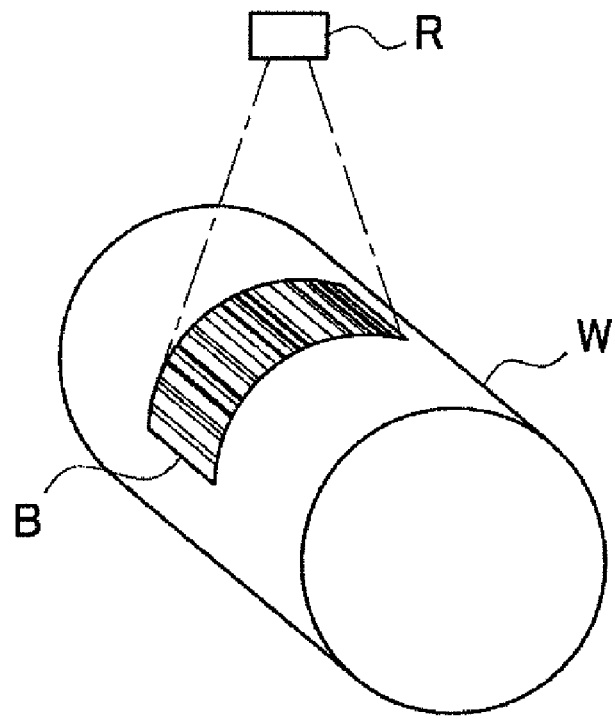
FIG. 14A is a perspective illustration showing an example where a barcode printed on a columnar work surface is read by a barcode reader.
Figure 14B:
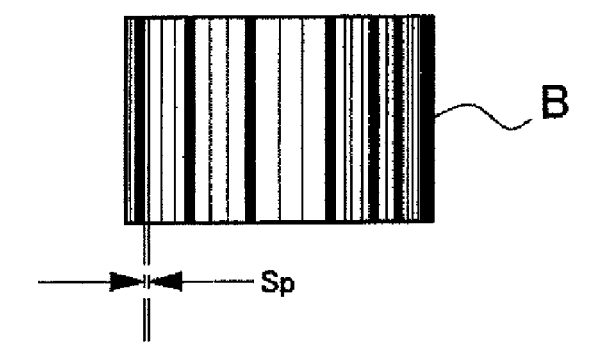
FIG. 14B is an illustration showing an orthogonal projection of the barcode as viewed by the optical barcode reader.
Figure 14C:
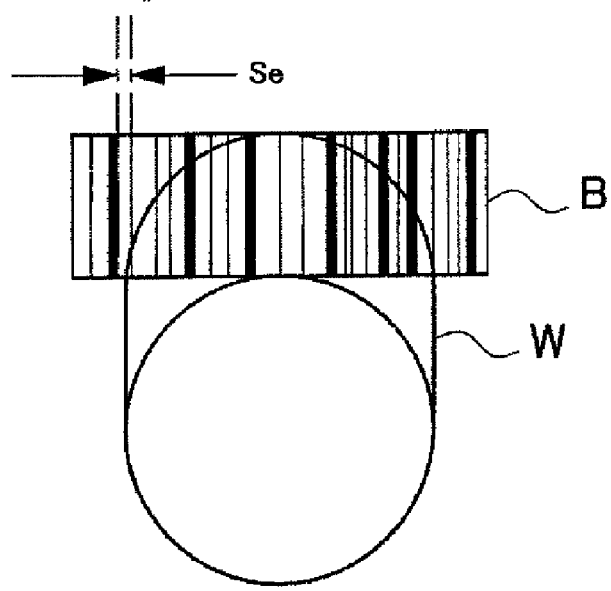
FIG. 14C is a perspective illustration showing the work surface and the print pattern expanded to plane.

FIG. 13 show a barcode as an example of an optically reader patterns. The barcode, which comprises a number of bars different in width and spaces between bars, encodes characters and digits according to rations between bars and spaces. Therefore, variations in bar and space widths make the optical barcode reader difficult to read the barcode precisely. A narrow space width and a thickness ratio between fine and heavy bars play a decisive role in the rate of read error. Specifically, considering an example shown in FIG. 14A where a barcode B printed on a columnar surface W of a work such as a can is read from right above by an optical barcode reader R, bars and spaces in a portion of the barcode that faces in front of the optical barcode reader R are readable precisely. However, as seen in FIGS. 14B and 14C showing an orthogonal projection pattern of the barcode printed on the columnar work surface W as viewed by the optical barcode reader R and an expander plane pattern of the barcode printed on the columnar work surface W, respectively, a narrow space Sp in close proximity to an end of the barcode B (an end farther away from an optical axis of the barcode reader) becomes smaller in width when viewed from the optical barcode reader R than the corresponding narrow space Se of the expanded barcode B on the columnar work surface W. In other words, the barcode deteriorate in apparent resolution. Therefore, the optical barcode reader R becomes harder to read the barcode, in particular spaces between the bars closer to the end, precisely. In consequence, the barcode reader deteriorates in a relative read rate due to deformation or distortion of the bars and spaces. This tendency is progressively promoted as the overall length of the barcode increases and as the curvature radius of the work surface decreases. The same problem occurs with respect to a character string and a graphic as well.

Figure 15A:
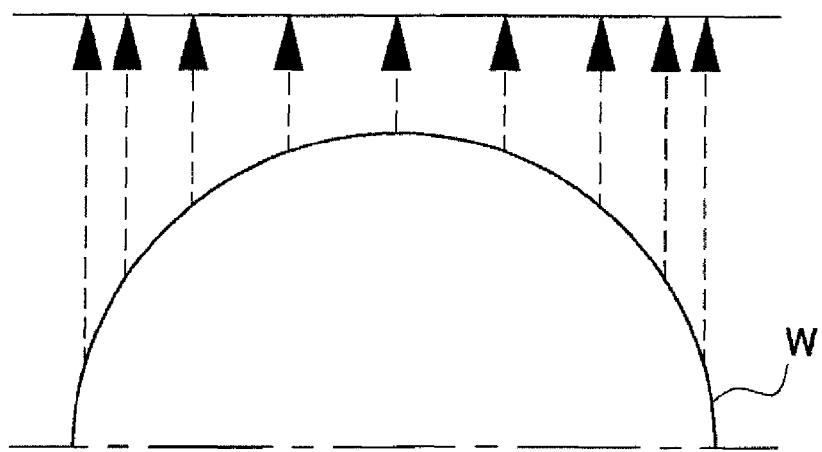
FIG. 15A is a side illustration showing a work surface and a print pattern printed on the work surface.
Figure 15B:
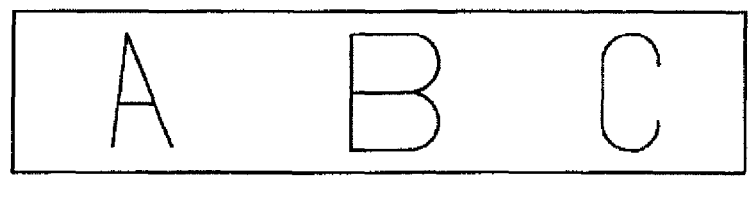
FIG. 15B is a illustration showing an orthogonal projection of the print pattern as viewed from above.
Figure 15C:
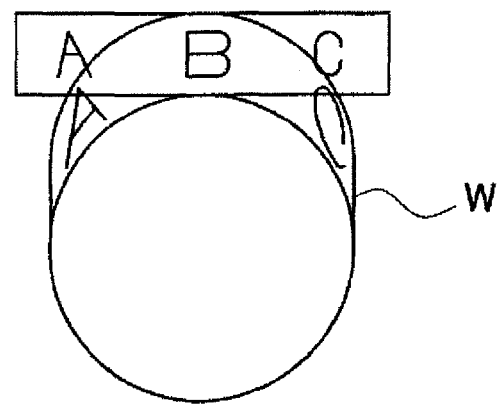
FIG. 15C is a perspective illustration showing the work surface with the printed thereon and the print pattern expanded to plane.

As shown in FIGS. 15A to 15C, an original pattern, e.g., a character string "ABC" in this embodiment, is ordinarily desirably printed on a columnar work surface W. When reading the character string "ABC" from right above the work, what the optical barcode reader captures is a character string "ABC" including deformed or distorted characters "A" and "C" and a character "B" remaining intact which are orthogonal projection of the characters "A", "C" and "B" printed on the columnar work surface W. As apparent From FIG. 5B, the characters "A"and "C" at opposite ends of the character string are distorted in character width as compared with the character "B" at the center. By the same reason as described above, the problem encountered by the character string is a deterioration in identifiability when the character string is read by an optical character reader. The same is true for symbols and graphics as well.

Figure 16A:
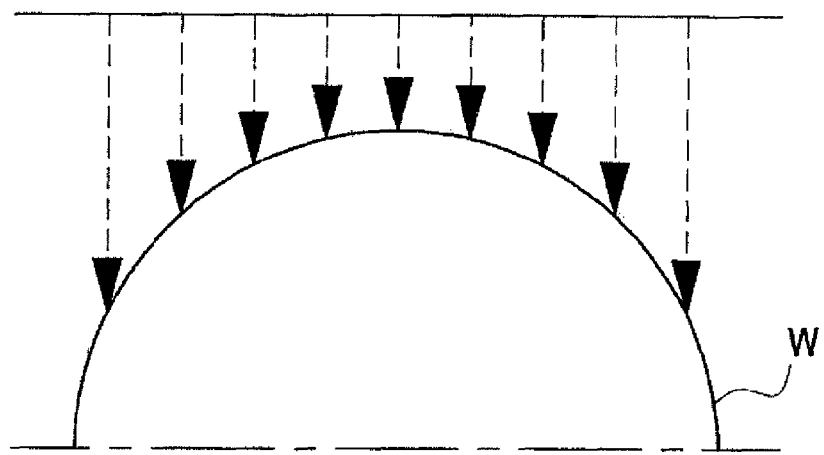
FIG. 16A is an illustration showing a relative position between a work surface and a deformed print pattern.
Figure 16B:
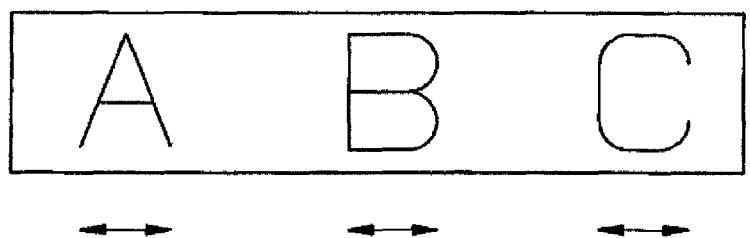
FIG. 16B is an illustration showing an orthogonal projection of the deformed print pattern as viewed from above.
Figure 16C:
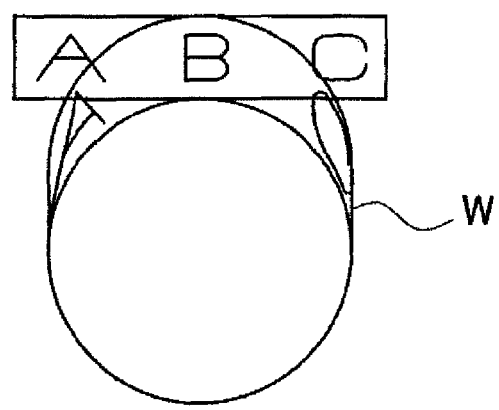
FIG. 16C is a perspective illustration showing the work surface with the deformed print pattern printed thereon and the deformed print pattern expanded to plane.

FIGS. 16A to 16B illustrate the function of the processing data generation means 80K of the processing data setting system of the laser marker of the present invention. FIG. 16A illustrates a condition of labeling a columnar work surface W with a character pattern "ABC" such as a trade name, an authenticator or a particular statement inherent to the work. FIG. 16B shows an orthogonal projection in plane of the character string "ABC" that is actually printed on the columnar work surface W. The orthogonal projection of the character string "ABC" is an original print pattern that bears specific information inherent to the work. FIG. 16C shows the columnar work surface W with the character string "ABC" printed thereon and an expanded plane pattern of the character string "ABC" printed on the columnar work surface W. A apparent, the character string "ABC" that is printed on the columnar work surface is deformed so that its orthogonal projection in plane is coincident or congruent with the original print pattern. That is, as seen From FIG. 16C, the character string "ABC" actually printed on the columnar work surface W is deformed or distorted according to the columnar surface. Specifically, the characters "A" and "C" at opposite ends are deformed or distorted in width as compared with their counterparts of the original print pattern "ABC" and a character "B" at the center is similar to counterparts of the original print pattern "ABC". Therefore, when specifying an original print pattern that bears specific information inherent to the work, the processing data generation means 80K generates data representing the initial print pattern and then converts it into data representing a deformed print pattern that is an orthogonal projection in plane of the original print pattern. The laser processing system prints the deformed print pattern on work surfaces. Therefore, the optical character reader retrieves correct information on the work.

Figure 17:
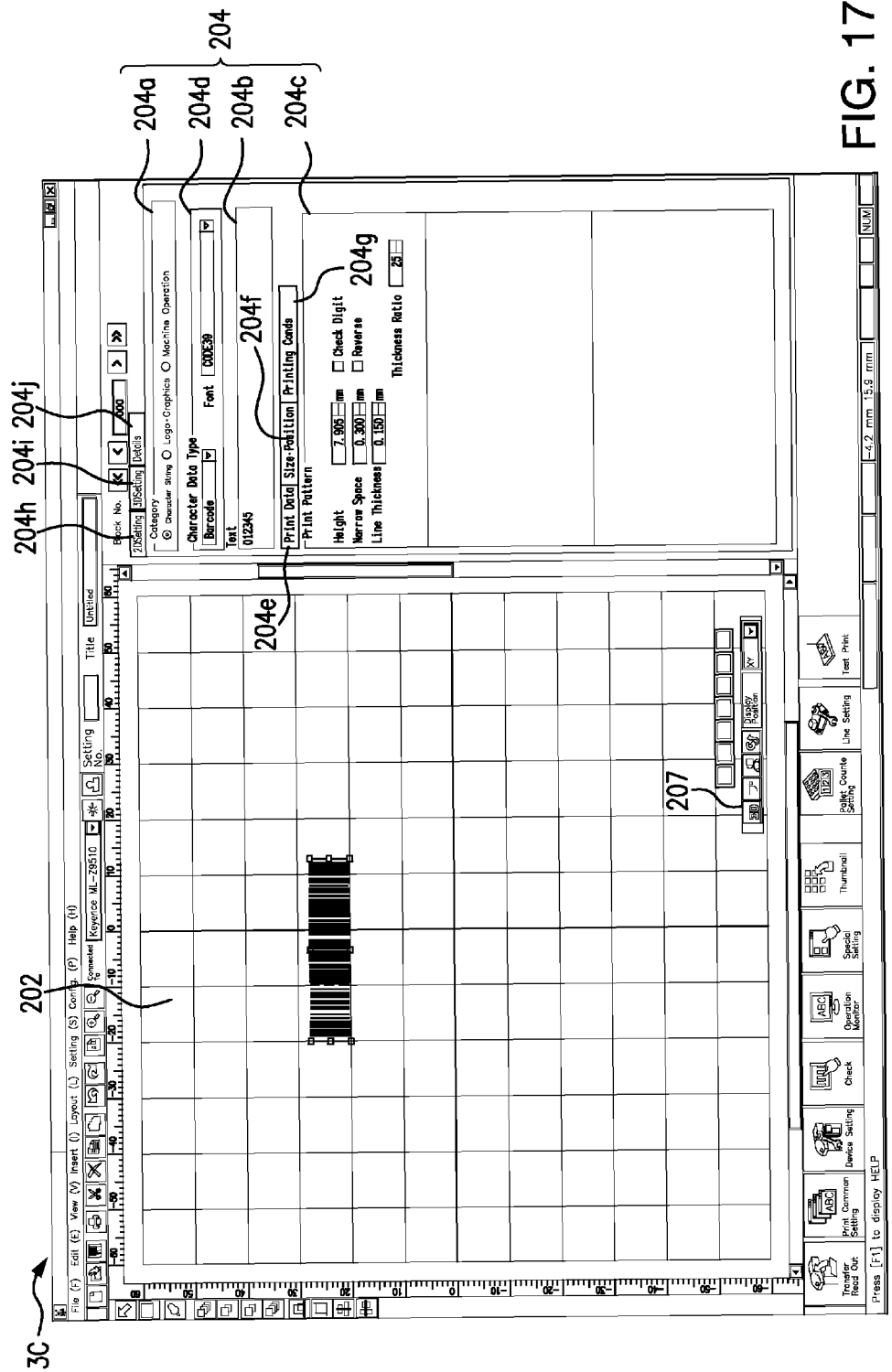
FIG. 17 is a photographic illustration showing a user interface window, namely an edit display window, in a 2D edit mode of a laser processing data setting program which displays a barcode.

FIG. 17 shows a user interface window of a computer program for achieving the function of the processing condition setting means 3C for setting laser processing conditions for processing or printing a plane work surface. As shown, the user interface window companies an edit display window 202 for displaying an object, i.e. a print pattern to be printed on a work surface in this embodiment, at the lest of the computer screen and a Print Pattern setting dialog box 204 for specifying various conditions necessary to edit a print pattern at the right of the screen. The print pattern setting dialog box 204 is provided with three dialog tabs 204h, 204i, and 204j for a 2D Setting, a 3D Setting and a Details Setting, respectively. The 2D Setting dialog tab 204h is enabled by default. In the 2D Setting dialog tab, there are provided a Print Category box 204a, a Text box 204b, a Details Setting dialog box 204c and a Character Data Type menu box 204d. The print Category box 204a includes three menu items, namely a character string, a design such as a logo and a graphic, and a machine operation. The character string is enabled by default. In the Character Data Type menu box 204d, a print type that the user wants to print is chosen from a pull-down print type menu. The print type menu includes options, namely a character, a barcode, a two-dimensional code and a RSS composite code. When each option is chosen, a pull-down menu appears to let the user specify a particular species of print type such as, for example, a font when the character is chosen, a barcode type such as CODE39, ITF, 2of5, NW7, JAN or Code 28 when the barcode is chosen, a two-dimensional code type such as QR code, Micro QR code or DataMatrix code when the two-dimensional code is chosen, or a RSS code type such as RSS-14, RSS Stacked, RSS Limited, RSS Expanded when the RSS composite code. In the Text, box 204b, characters that the user wants to print are typed. The characters are printed later on in the form of a character string in the typed order when the print type chosen in the Character Data Type menu box 204d is the Character. On the other hand, when a symbol is chosen in the Character Data Type menu box 204d, the character entered in the Text box 204b is printed later on in the form of an encoded pattern according to the symbol. The pattern encoding is achieved by the processing data generation means 80K, or otherwise may be achieved by the processing condition setting means 3C as well. The Details Setting dialog box 204c has three tabs 204e for Print Data, 204f for Print Size Position, and 204g for Printing Conditions.

The computer program enables to print three-dimensional work surface. Profiling of three-dimensional work surface is possibly performed through the work surface profile input means 3A in the following ways.

(1) A Method of Drawing a Three-Dimensional Work by the Use of a 3D Graphic Design Program.

This method uses drawing tools such as a line tool, a curve tool, box tool, etc. functionally similar to existing three-dimensional CAD software, three-dimensional modeling software and drawing software in order to create a three-dimensional graphic image. This method is casually used by users skilled in the task of three-dimensional graphics drawing and, however, is profound for users who are unfamiliar with three-dimensional data editing.

(2) A Method of Defining a Three-Dimensional Work Surface Profile by Specifying Geometric Parameters in the Form of a Dialog.

This method uses wizard software to define a three-dimensional graphic image through an interactive dialog. This method is casually used because of no requirement for knowledge and experience of three-dimensional graphics drawing. For example, the method is in need of specifying a work profile and parameters for defining the profile only. Specifically, a user is required only to select a desired work profile from an option menu and to specify parameters for the selected work profile. Necessary parameters to specify include position coordinates of a control point and a direction of normal vector when selecting an oblique plane; coordinates of a control point, a curvature radius or a diameter of a column, coordinates of a center of a circle as an envelope of the column and/or a direction of center axis of the column when selecting the column, and coordinates of a center and a radius when selecting a sphere.

(3) A Method of Importing a 3D Data File Prepared for a Work Surface Profile and Converting it.

This method uses a 3D data file of a work surface provided separately by a 3D CAD program and converts it into a 2D data file. Because 3D data files previously provided are available, this method saves user a lot of labor. In this instance, readable data file formats include various generalized file formats such as a DXF format, an IGES format, an STEP format, an STL format, a GKS format and the like. Furthermore, a format exclusive to application such as a DGW format may be used for 3D data file conversion.

(4) A Method of Importing an Actual Image of a Work Surface Through an Image Recognition Device Such as an Image Sensor.

This method automatically acquires data by importing an image of a work surface through an image sensor or the like.

Figure 18:
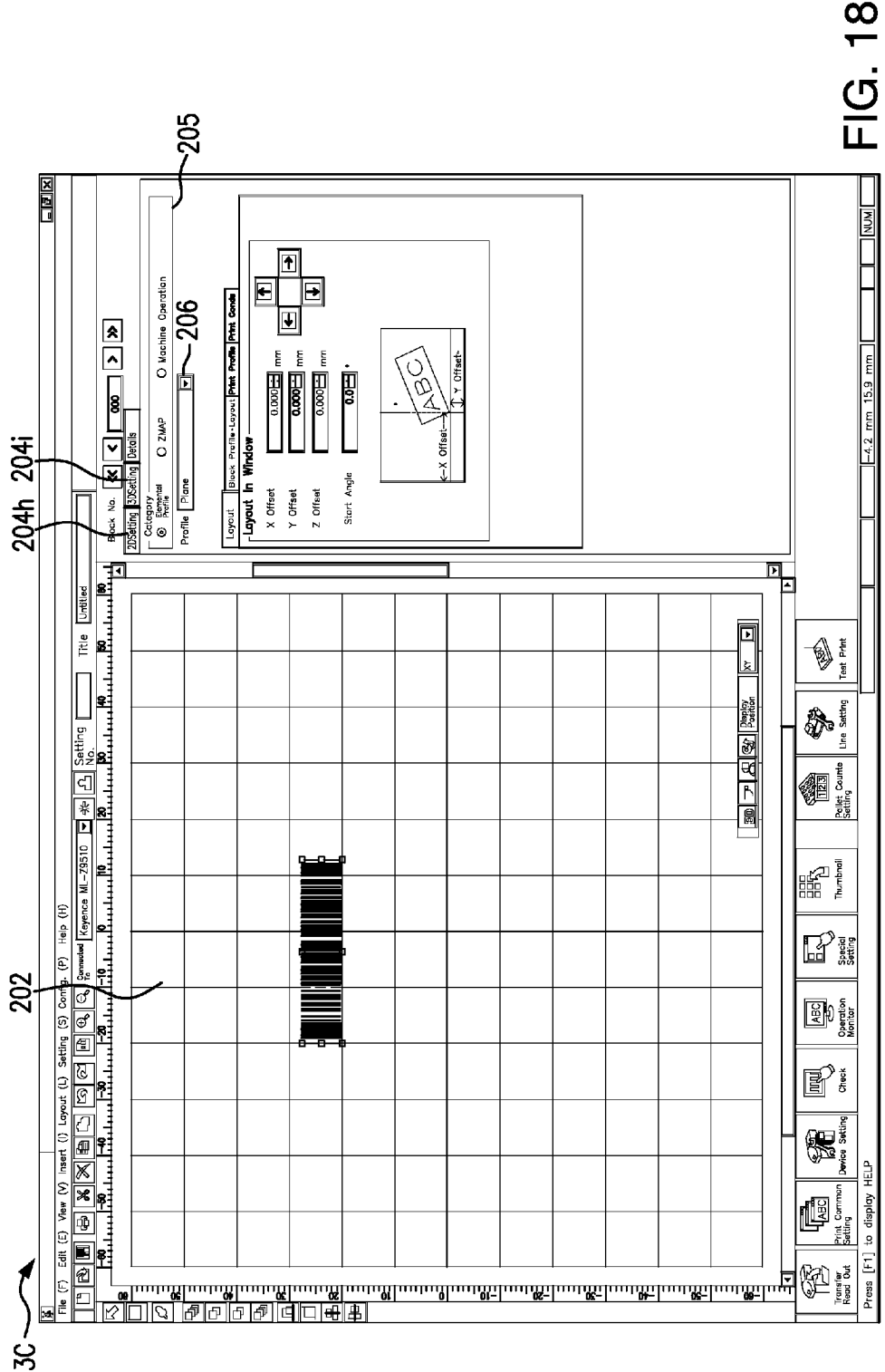
FIG. 18 is a photographic illustration showing the edit display window for mode switch to a 2D edit
Figure 19:
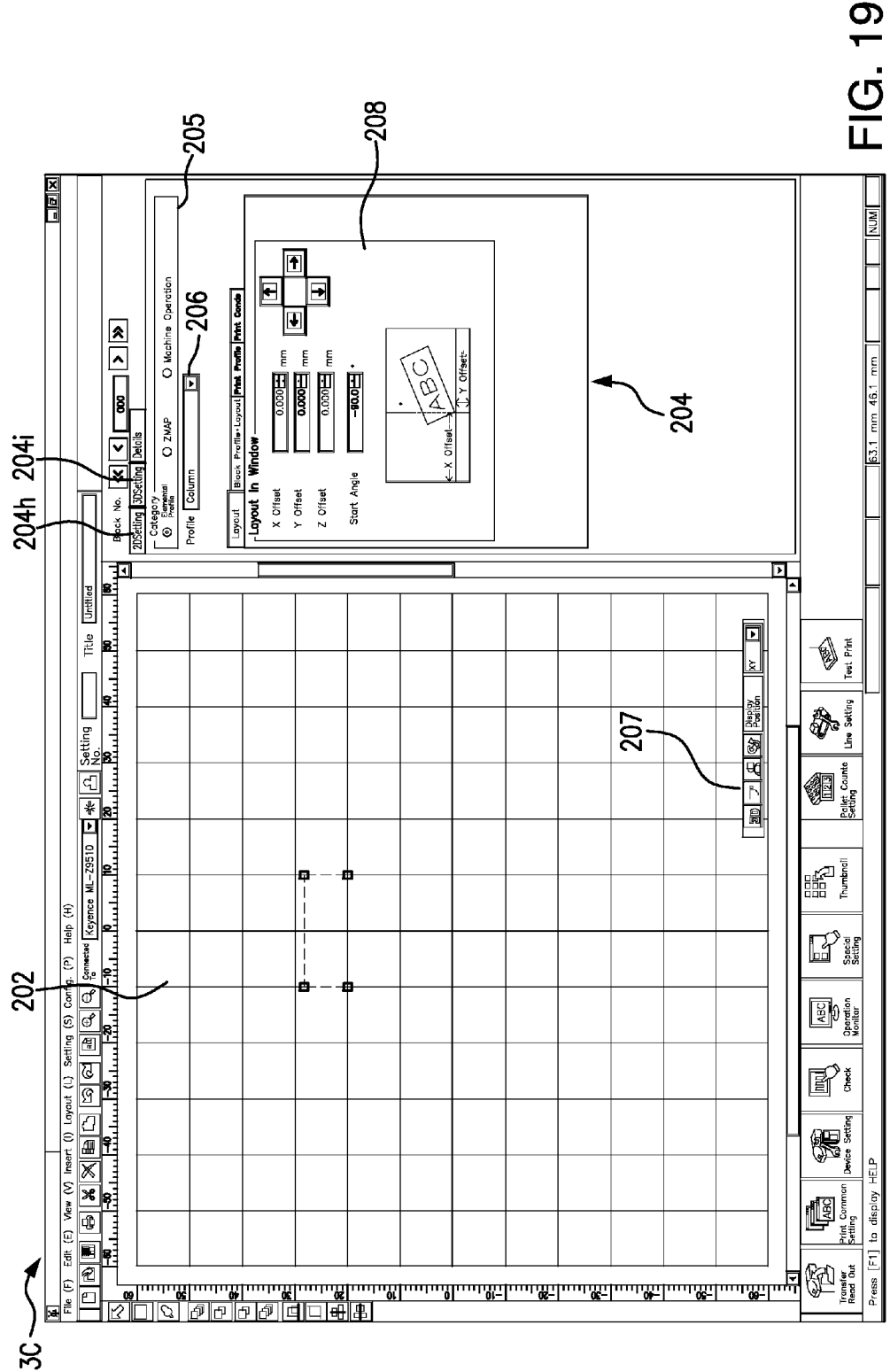
FIG. 19 is a photographic illustration showing the edit display window for mode switch to a 3D edit mode in which a column is selected.
Figure 20:
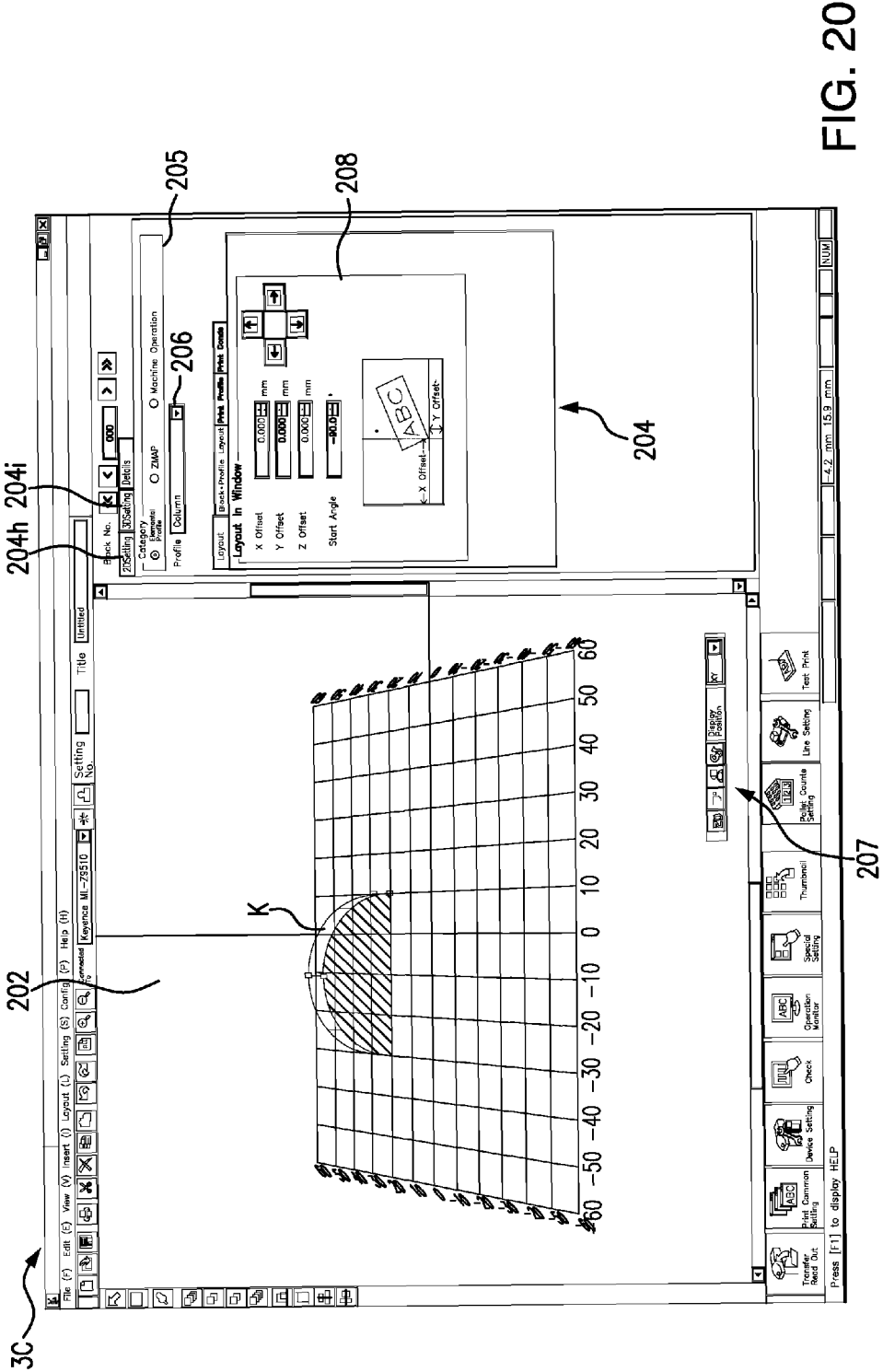
FIG. 20 is a photographic illustration showing the edit display window switched from a 2D view mode to the 3D view mode.

Referring to FIGS. 18 to 20, the methods (2) and (3) are employed in this embodiment. Specifically, there are provided means for selecting pre-arranged elemental profiles and means for reading a data file of 3D profile. When choosing a 3D Setting tub 204i in the Print Pattern setting dialog box 204, the 2D Setting tub 204h shown in FIG. 17 which is enabled by default disappears. In the 3D Setting dialog tub 204i which includes a Print Category box 205 having three options, for example Elementary Profiles, ZMAP and Machine Operation. The Elementary Profile is enabled by default. When the Elementary Profile is chosen, a Profile menu box 206 is enabled to choose on of elementary profiles such as a plane, a column, a sphere, a cone, etc. in a profile menu. The plane is selected by default and highlighted. Then, when choosing the column in the Profile menu box 206 as shown in FIG. 19, the edit display windows 202 changes an object from plane-shaped to column-shaped.

The edit display window 202 can be changed between a 2D view mode and a 3D view mode every time a view switch button 207A of a tool bar 207 is pressed. For example, when pressing the view switch button 207A in the edit display window 202 shown in FIG. 19, the edit display window 202 changes to the 3D view mode as shown in FIG. 20 in which an object is displayed in three dimensions. On the other hand, when pressing the view switch button 207A in the edit display window 202 shown in FIG. 20, the edit display window 202 changes back to the 2D view mode shown in FIG. 19 in which an object is displayed in two dimensions. A readable area is enclosed by a frame K in the 3D view mode as well as in the 2D view mode. In this way, the edit display window 202 can be alternately changed between the 2D view mode and the 3D view mode as needed. An icon on the view switch button 207A is altered between an indicator of "2D" and an indication of "3D" correspondingly to view mode switching from one to another. Although the tool bar 207 including the views switch button 207A is in the form of a floating bar which can be freely dragged and dropped within the window, the tool bar 207 may be incorporated in an ordinary fixed tool bar, or otherwise may be hidden as needed.

When displaying a print area on a three-dimensional work surface in three dimensions together with a work surface profile, it is visually checked up whether the printing area is in an appropriate printable position relative to the work surface. In this embodiment, a work surface is differently colored between a work surface area upon which a laser beam impinges at angles in a predetermined range for appropriate print quality (a printable work surface area) and a work surface area upon which a laser beam impinges at angles out of the predetermined range and is expected to be printable but defective in print quality (a defective printable work surface area). Specifically, the printable work surface area remains uncolored, and the defective printable work surface area is colored red. In this way, it is visually checked up on whether a specified print area falls thoroughly within a printable work surface area and which part of a specified print area cuts across a defective printable work surface area even partly. Further, in the case where a work surface including a print area is at a backside of a work relative to laser irradiation, a print area is not displayed in the edit display window 202 in the 3D view mode so as thereby to indicate that the specified print area is unprintable (an unprintable work surface area). This function impresses it on the user whether a print area of the work surface that the user specified is printable or defective or unprintable, so that the user can be easily prodded to correct the print area. This function is not bound up with the above means. It is permitted to employ any visual announcement means known to those skilled in the art for indicating, printable, defective printable and unprintable work surface areas. For example, an indication of these work surface areas may be made by text messages on the edit display window 202 or in the dialog box, by voice messages, or by an alarm sound. It is practicable to indicate one of the three situations. For example, users can draw satisfaction from an indication of unprintable work surface area only if the user takes no account of print quality.

As just described above, an incident angle of laser beam that defers a printable work surface area and a defective printable work surface area from each other is specified by a default initial angle, or otherwise may be specified by entering another angle in an entry box additionally provided in the edit display window 202. Specifically, laser processing of a work surface is limited and made difficult depending upon angles and lowers its precision as an irradiation angle θ with a normal to the work surface comes close to 90°. A critical irradiation angle or higher limit angle (processing limitation angle) is ordinarily fixed to 60° and may be, however, adjusted by the user.

In this way, it arises in three-dimensional printing according to work profiles and relative position between an work surface and a laser beam that some work surface areas are unexposed or exposable but insufficiently to the laser beam, in other words, unprintable or printable but defectively. Therefore, it is practicable to calculate a printable work surface area based on these factors and to caution the user to try another setting when representation of laser printing data falls within an unprintable work surface area. This calculation is performed in the arithmetical and logic unit 80. The arithmetical and logic unit 80 enables the defective work surface area detection means 80B to detect a defective work surface area by performing calculations, the processing condition adjusting means 80C to adjust printing conditions so as to make the defective printable work surface area well printed, the highlighting means 80I to highlight the defective printable work surface area detected by the defective work surface area detection means 80B so as thereby to display it differently from a printable work surface area, and the warning means 80J to provide a warning that a print pattern set by the processing condition setting means 3C cuts across even partly a defective printable work surface area.

Figure 21:
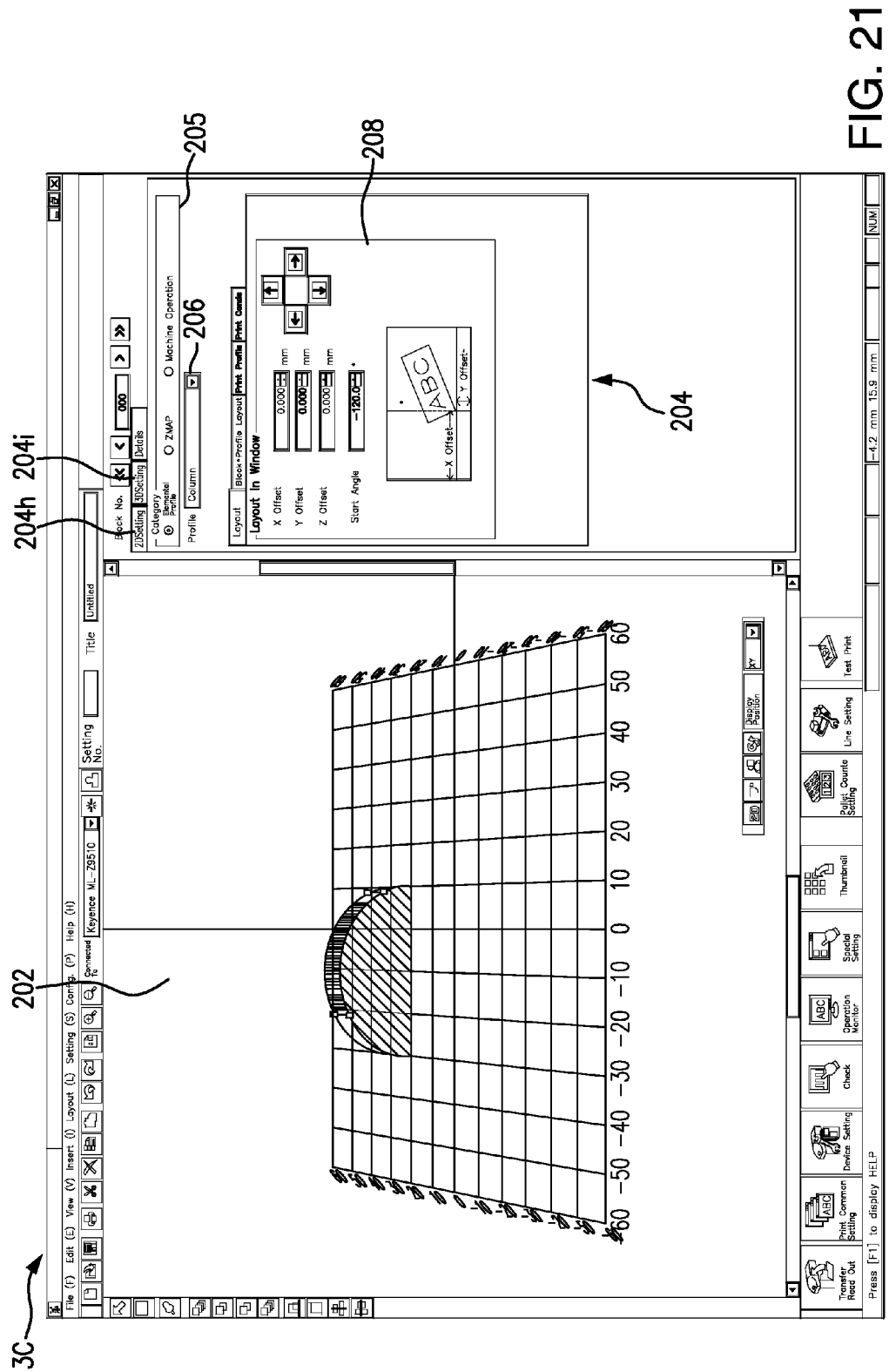
FIG. 21 is a photographic illustration showing the edit display window in the 3D edit mode in which a print start angle is adjusted.

Referring to FIG. 20, a work surface area close to the bottom of a columnar work surface that is printable but defectively, or unprintable due to a narrow angle of a laser beam incident thereupon is colored red. It is practicable to prod the user to try another print pattern by hiding a specified print pattern when the specified print pattern cuts across even partly an unprintable work surface area and is impossible to be completely printed consequentially. Foe example, a specified print pattern is hidden when falling behind a specified work surface with respect to laser radiation and colored red when falling out of a printable work surface area. In a demonstrative case shown in FIGS. 19 and 20 where a long narrow barcode is printed on a columnar work surface, since the barcode of not less than 50% of length cuts across an unprintable work surface area, the barcode is hidden behind the edit display window 202. On that account, as shown in FIG. 20, the 3D Setting tab 204i is enabled to open the Layout dialog box 208 in which a print start angle is changed from 90° (a default angle) to 120°. As a result, the barcode is displayed as shifted as shown in FIG. 21. In this way, a print pattern is set up by adjusting a print start position, a work surface area, a narrow space width, a bar thickness and the like so as thereby to be accurately printed. It may be optionally specified by the user how making a print pattern appear or disappear and how setting a threshold for disappearance.

In the edit display window 202 in the 3D view mode, it is enabled to change a view print at a user's discretion. The view point is moved desirably as shown in FIG. 22 correspondingly to movement of scroll bars 209 in the edit display window 202 in the 3D view mode shown in FIG. 21, or otherwise, by dragging any point of the edit display window 202.

Figure 22:
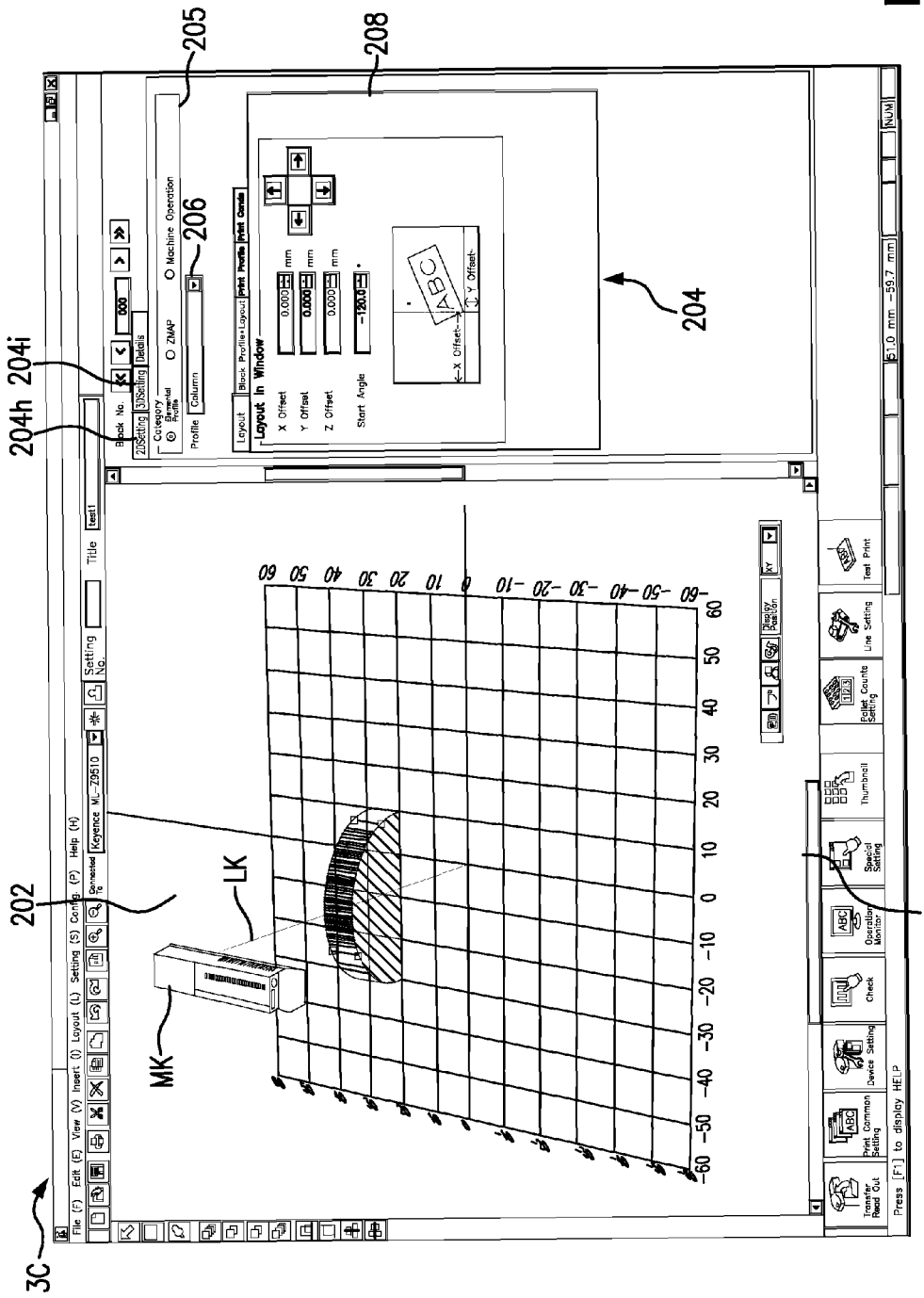
FIG. 22 is a photographic illustration showing the edit display window in the 3D edit mode in which a view angle is changed.
Figure 23:
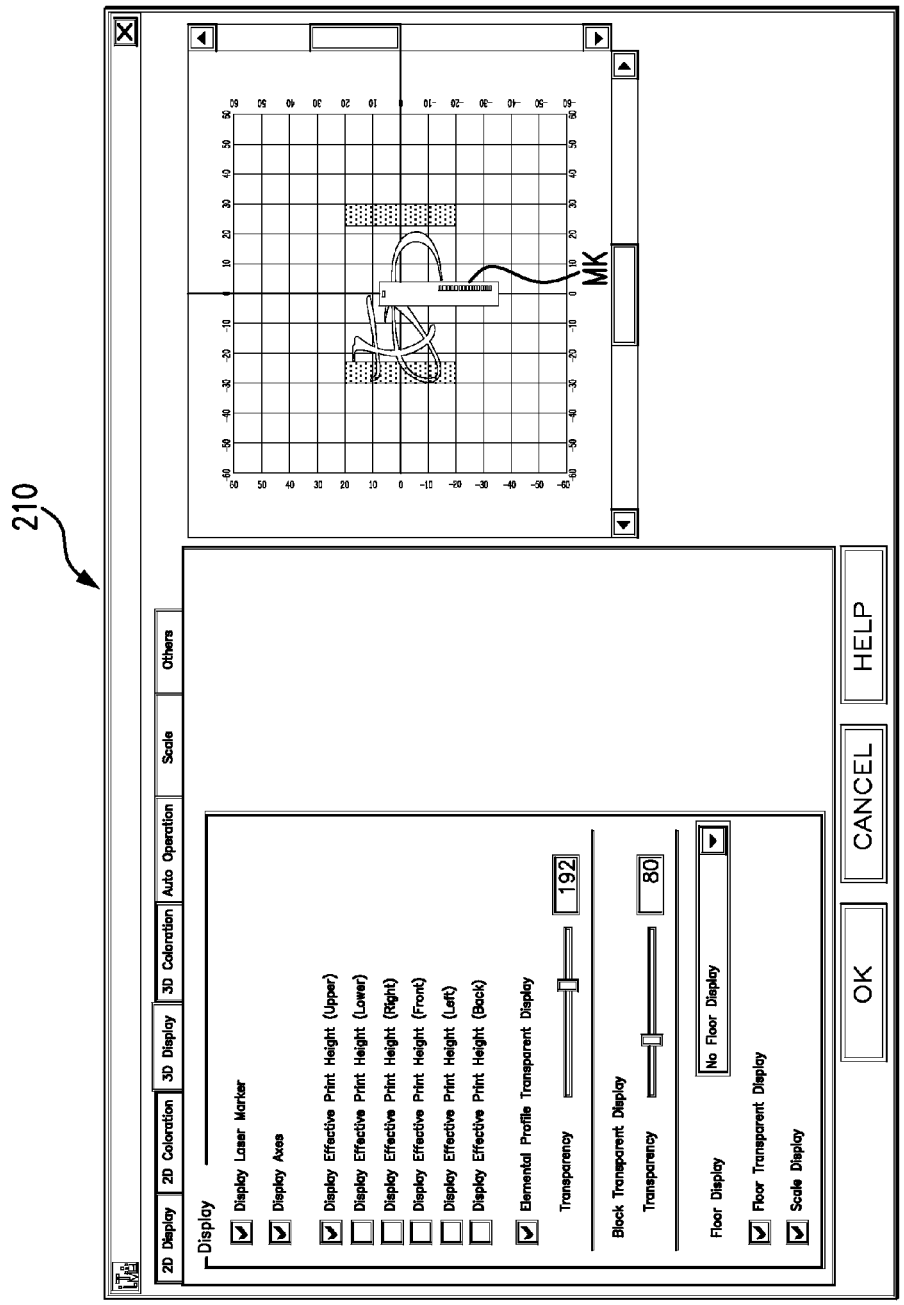
FIG. 23 is a photographic illustration showing a display/non-display setting window.
Figure 24:
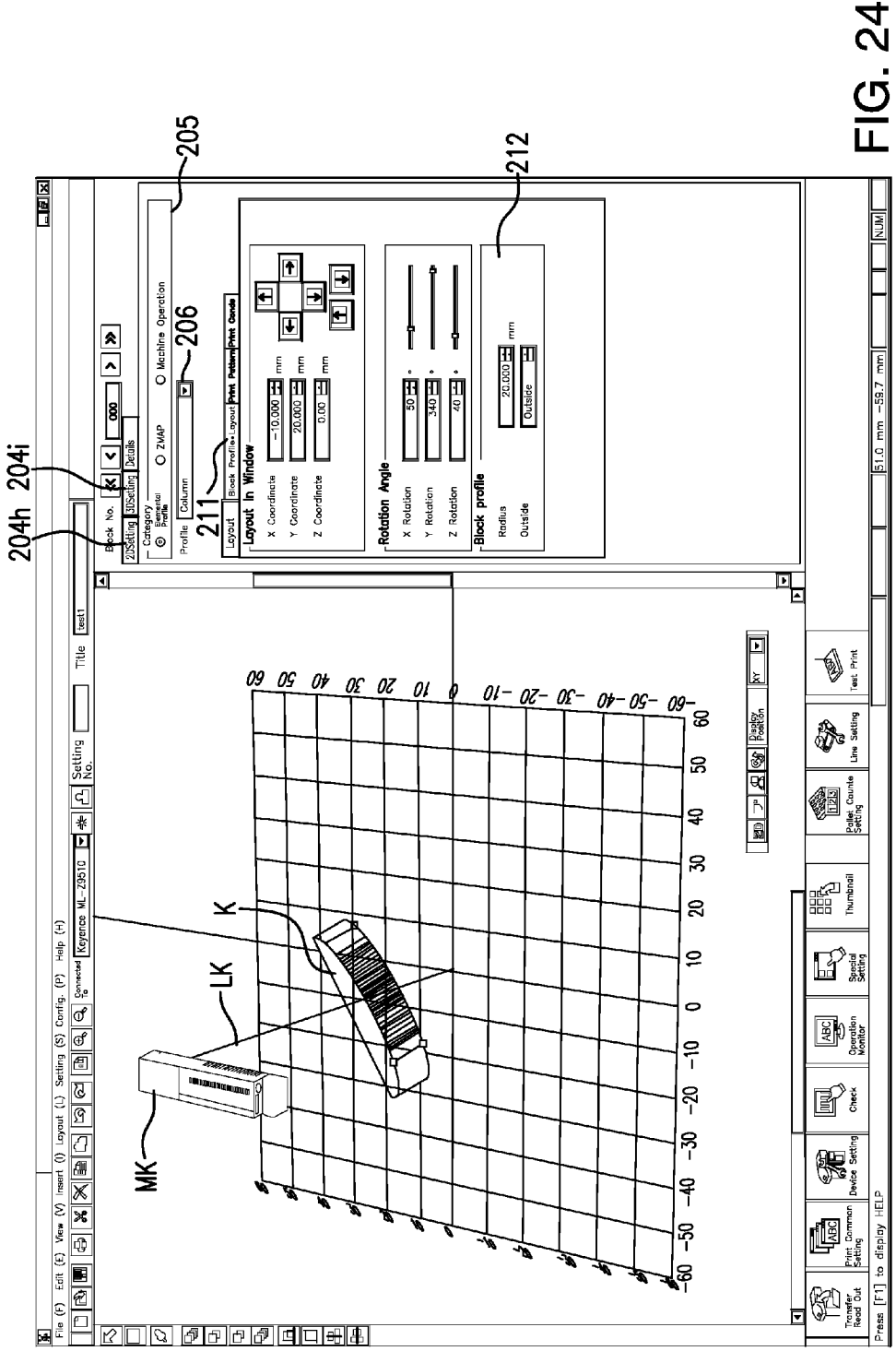
FIG. 24 is a photographic illustration showing the edit display window in which a layout of a work surface is changed.

Referring to FIGS. 22 and 23, it is enabled to display a direction of laser radiation in the edit display window 202 in the 3D view mode. As shown in FIG. 23, the laser marking head is shown by an icon MK similar in shape to the laser marking head, and a laser beam LK is displayed by straight line. This representation of the laser marking head MK and the laser beam LK makes it easy for the user to get hold of printing direction relative to an unprintable work surface area. Further, as shown in FIG. 23, a display configuration window 210 displays a 2D Display tab chosen by default which includes a Display Laser Marker check box. The laser marker icon MK is displayed or hidden by alternately checking the Display laser Marker check box.

The laser processing data setting program has the function of adjusting a layout of a work surface in the edit display window 202. As shown FIG. 24, when choosing a Block Profile Layout tab 211 in the 3D Setting tab 204i, a details setting box appears to let the user specify details of a block profile, including coordinates of a base position of a print block, angles of rotation of the print block and details of a block profile. When a columnar work surface is chosen, a radius of a column and a print side, inner or outer are specified in a Block Pattern Layout dialog box 212.

The laser processing data setting program has the function of processing a three-dimensional work surface that is running with precise. The processing data generation means 80K generates processing data based on processing conditions specified through the processing condition setting means 3C so that the processing data represents the three-dimensional work surface. In this instance, profile information on three-dimensional factors of the work surface (a radius of a column in the case of a columnar work surface) is specified through the work surface profile input means 3A, and information on a moving speed of the work surface is specified through the speed input means 3D. The processing data generation means 80K generates processing data according to the three-dimensional work surface based on the information.

Figure 25:
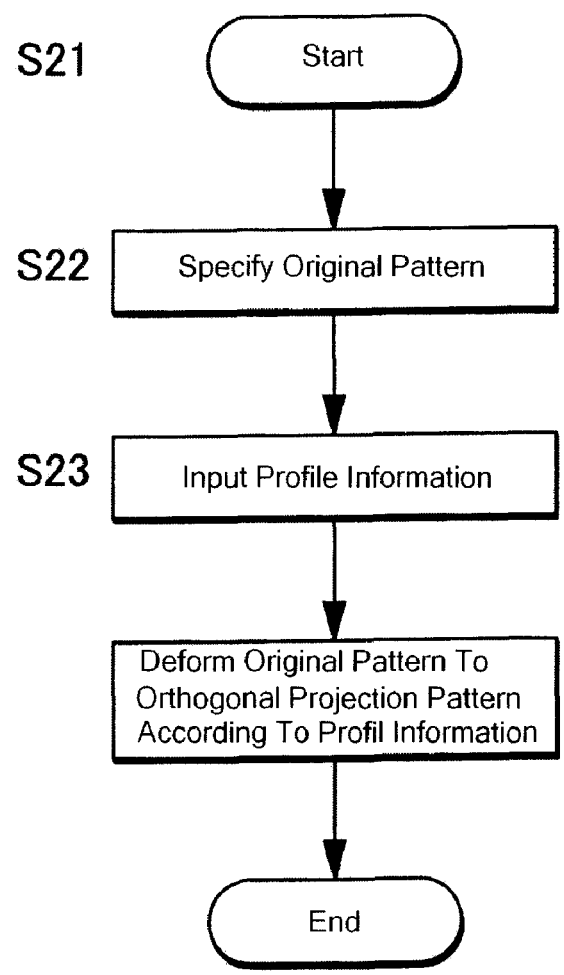
FIG. 25 is a flowchart illustrating a sequence of generating a reading pattern by specifying printing conditions.

FIG. 25 is a flowchart illustrating a sequence of generating data representing a specialized print pattern specialized for optical reader exclusive use that is achieved by the processing data generation means 80K during execution of the laser processing data setting program. In first step S21, data representing an original print pattern is generated by specifying printing conditions through the processing condition setting means 3C and an encoding pattern type. Specifically, in the example shown in FIG. 17, after choosing "Character String" in the Print Category box 204a, the user choose "Barcode" and "CODE39" in the Character Data Type menu boxes 204d and, subsequently, types numerical characters "012345" in the Text box 204b. The arithmetical and logic unit 80 makes calculations based on the information thus specified to generate data representing an original print pattern. As a result, the edit display window 202 in the 2D edit mode displays a plane-shaped CODE35 barcode. Although a CODE35 barcode is automatically created according to the conditions specified by the processing condition setting means 3C in this embodiment, nevertheless, it is practicable to enter a barcode directly. For example, it is permitted to choose an image from an image data file of specialized print patterns, such as various prepared barcodes and symbols, at the processing condition setting means 3C, or to copy a specialized print pattern created by another application program and paste it in the edit display window 202.

In subsequent step S22, a profile is specified through the processing condition setting means 3C. Specifically, when choosing the 3D Setting tab 204i of the Print Pattern setting dialog box 204 shown in FIG. 17, a Print Category box 205 and the Profile menu box 206 appears as shown in FIG. 18. Then, a column is chosen as an elemental profile in the Print Category box 205 shown in FIG. 18. As a result, a display of column in the edit display windows 202 shown in FIG. 19 that is in the 3D edit mode but in the 2D view mode is changed from plane-shaped to column-shaped. At this time, when pressing the view switch button 207A if the tool bar 207, the columnar work is displayed in a 3D representation in the edit display window 202 as shown in FIG. 20.

In this way, after displaying an original print pattern in plane in the edit display window 202 in the 3D edit mode but in the 2D view mode by specifying information on the an original printing pattern in step S21, the original print pattern is changed into a three dimensional representation in the edit display window 202 in the 3D edit mode and the 3D view mode by specifying information on a work profile in step S22. Through these steps, the user can visually take how the original print pattern changes in appearance on the columnar work surface. In the print pattern generating sequence, steps S21 and S22 may be replaces with each other. The print pattern displayed in three dimensions that was provided by specifying an original print pattern and a work profile is then deformed to an orthogonal print pattern according to the work profile in step S23 for the grounds previously described.

Figure 26:
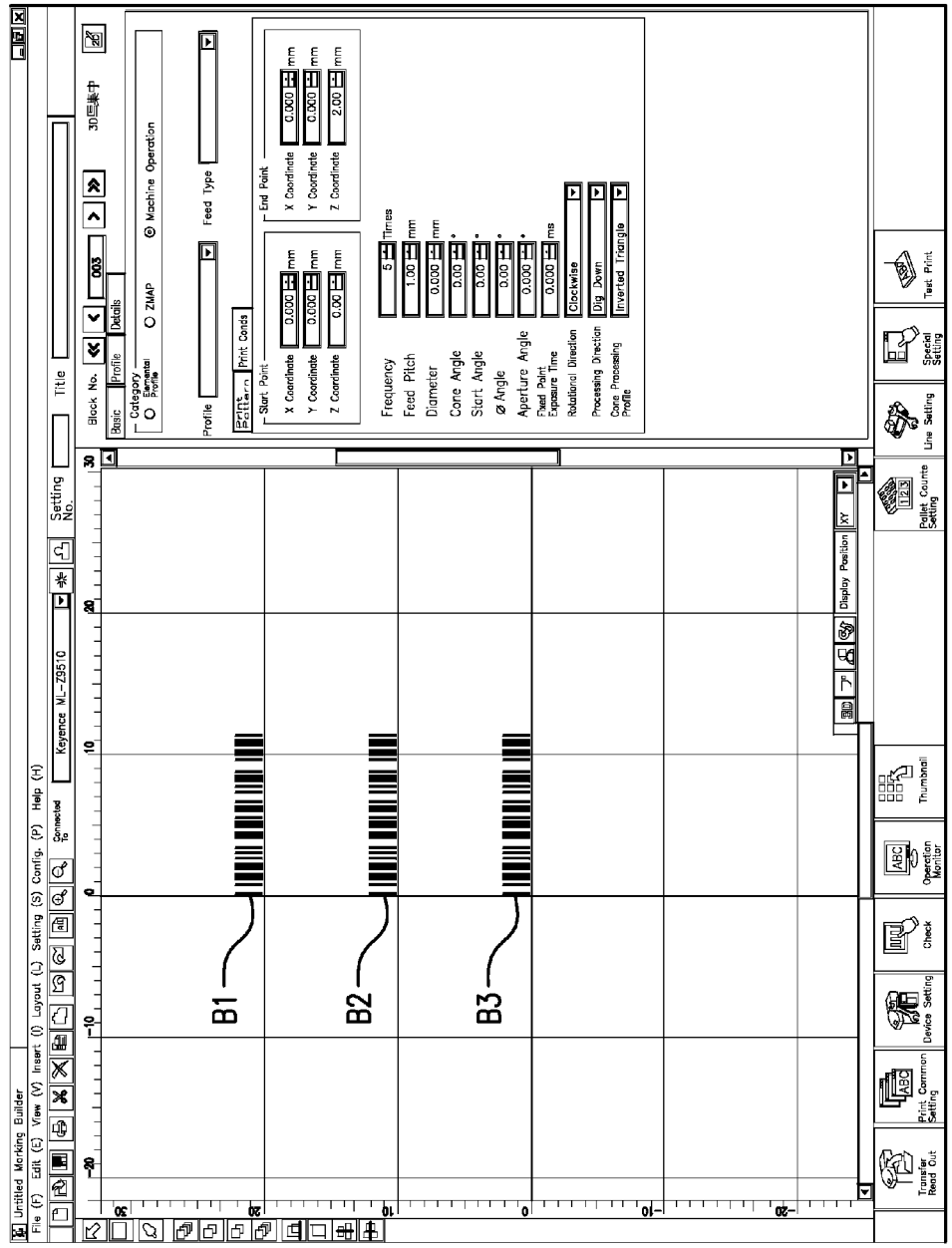
FIG. 26 a photographic illustration showing the edit display window in which the same three barcodes are displayed.
Figure 27:
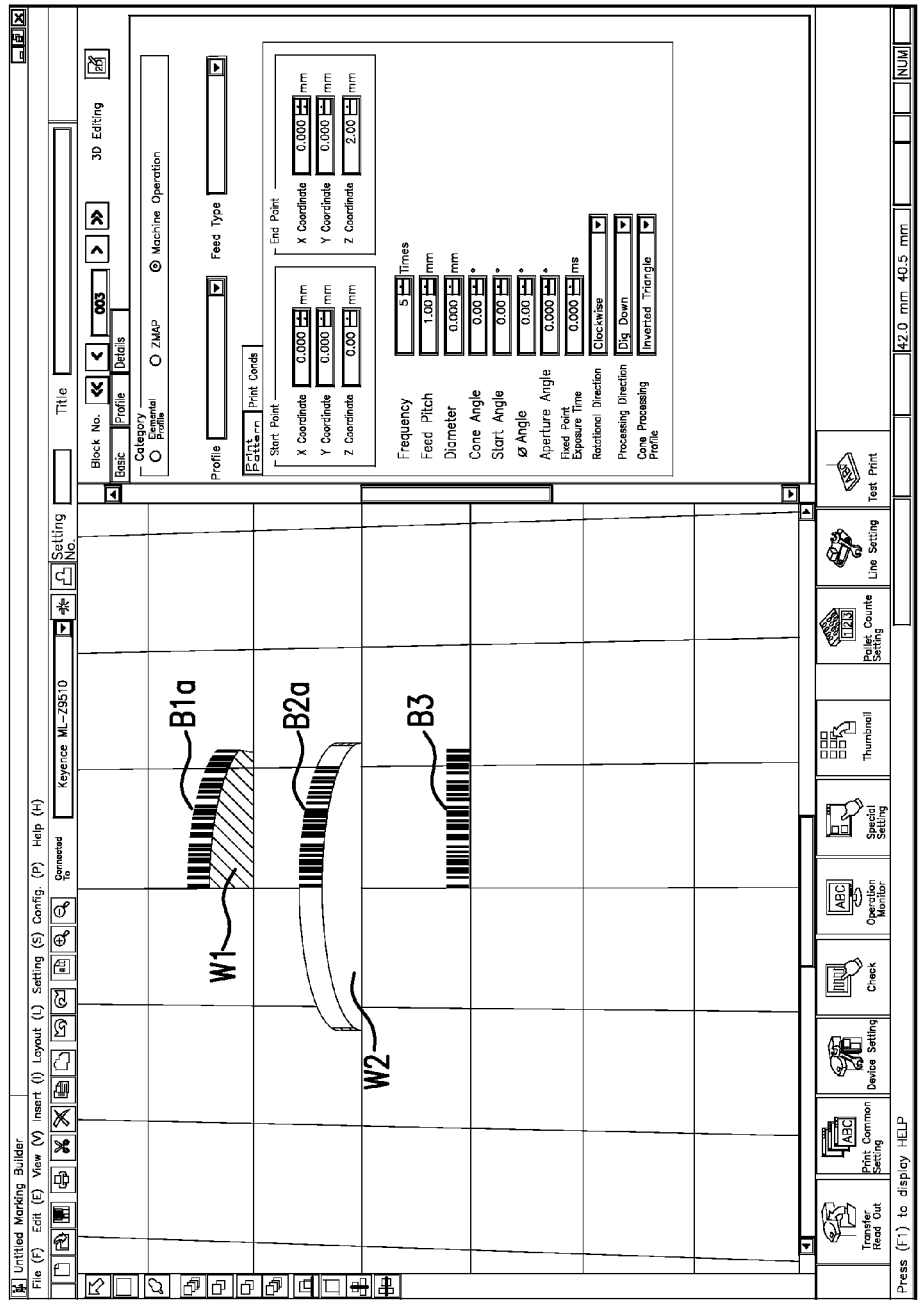
FIG. 27 is a photographic illustration showing the edit display window in which the barcode are displayed together with a columnar work surface in three dimensions.
Figure 28:
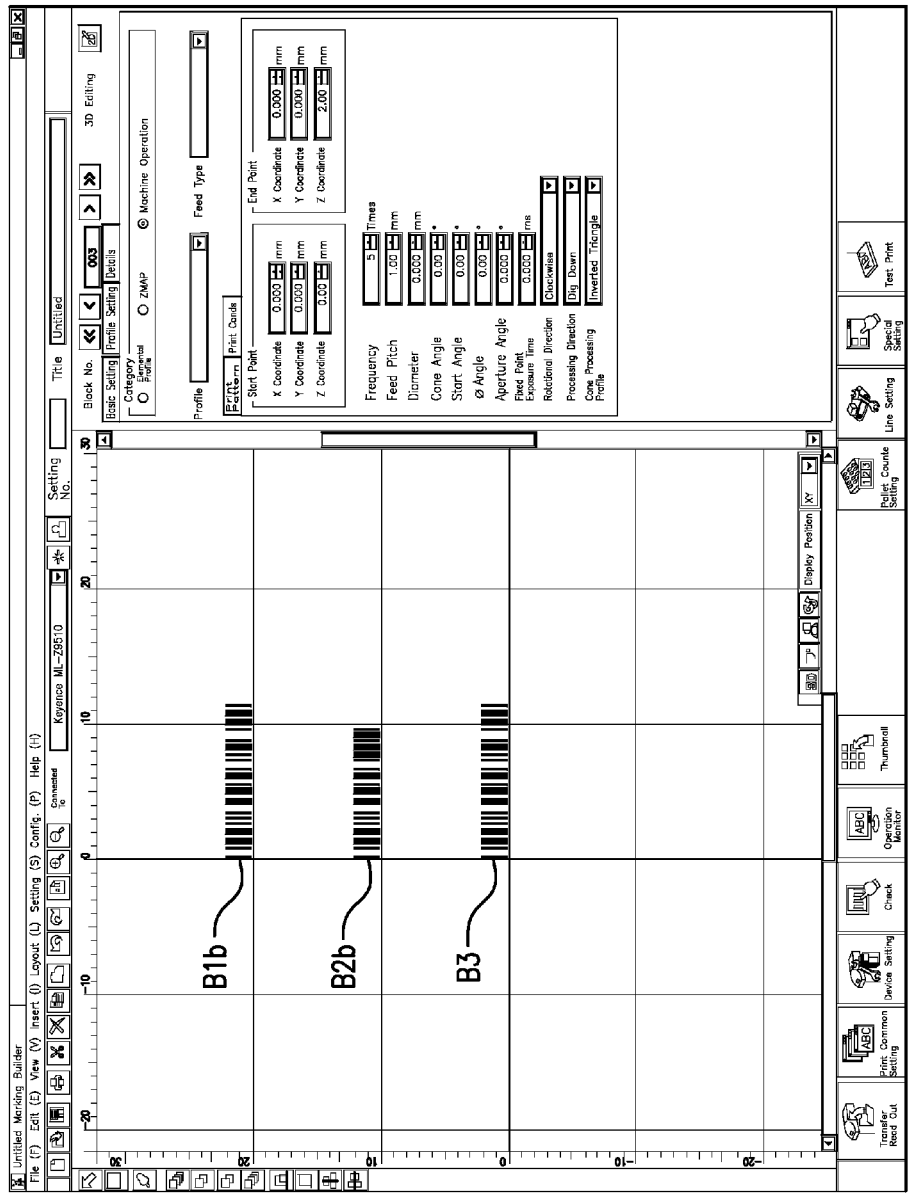
FIG. 28 is a photographic illustration showing the edit display window in which orthogonal projection of the columnar work surfaces.

FIGS. 26 to 28 are expository illustrations of the print pattern deformation procedure, FIG. 26 shows three identical barcodes B1, B2, B3 as original print patterns on a plane surface. FIG. 27 shows a barcode B1a transferred onto a columnar work surface W1 that is a deformed pattern of the original barcode B1 projected in the form of orthogonal projection on the same columnar surfaces as the columnar work surface W1 and a Barcode B2a a columnar work surface W2 that is the original barcode B2 transferred directly onto the columnar work surface W2. In this instance, the columnar work surfaces W1 and W2 are differed in diameter from each other for an easy understanding of a representational difference between the barcodes B1a and B2a. However, the diametrical difference between two work surfaces has no effect directly on the print pattern deformation. The barcode B3 remains put on a plane surface in FIGS. 26 and 28. The barcode B1a has bars and spaces increasing in width as the bars come close to a bottom of the columnar work surface W1. On the other hand, the barcode 2 has bars and spaces remaining unchanged in width over the length. FIG. 28 shows the barcodes B1a, B2a and B3 in orthogonal projection. As apparent in FIG. 28, the barcode B1a (which is hereinafter referred to as a deformed barcode, i.e. a deformed print pattern) is identical with the barcode B3. In other words, the barcode B1 a in orthogonal projection has just the same representation of bars and spaces as the original barcode B1 because the barcode B1 has an orthogonal projection pattern of the original barcode B1. However, the barcode B2a in orthogonal projection has bars spaces decreasing in width as the bars come close to an end thereof corresponding to the bottom of the columnar work surface W2. That is, the barcode B1a is read by an optical barcode reader as though it is the original barcode B3. As apparent, when printing a deformed print pattern on a work surface, the optical reader reads it as though it is an original print pattern, so that the rate of read error of the optical reader is significantly decreased.

The print pattern deformation is achieved by the arithmetical and logic unit 80 achieving the function of the processing data generation means 80K. The arithmetical and logic unit 80 converts data representing the original print pattern into data representing a deformed print pattern (an orthogonal projection of the original print pattern on a columnar work surface). Although it is usual to print a deformed barcode at fixed printing or scanning pitches (scanline density), it is practicable to print an original barcode at varying printing pitches (scanline density) so as to print a deformed barcode spuriously. In such a spurious barcode printing, the barcode degrades in density as it comes to an end. However, since the spuriously deformed barcode in orthogonal projection is narrowed in overall length, the barcode virtually makes up a drop in print density as has no significant effect on its identifiability. The spurious barcode printing barcode printing has the advantage of preventing a printing speed from dropping because it is required to vary scanline density only without increasing the number of scanlines. Further, in the case where a spuriously deformed barcode is too long to be printed at a required density, another laser scanning is additionally applied to achieve the required density. In this case, although the spurious barcode printing takes a somewhat long time to complete the barcode due to an increased number of scanlines, an increase in printing time is held to a minimum because the total number of scanlines is decreased as compared to ordinary fixed printline density printing.

In the above description, the optical axis or optical reading direction of the optical reader is aligned with the normal to the work surface. Alternatively, the optical axis of the optical reader may be at any oblique angle with a work surface, three-dimensional or two-dimensional. In other words, the optical reader may be installed in any location. In such a case, the arithmetical and logic unit 80 converts data representing an original print pattern into data representing a deformed original print pattern projected in the form of oblique projection on the same surface as the work surface. For the same reasons as described above, the rate of read error of the optical reader is significantly decreased. The optical reading direction setting is achieved through the reading direction adjusting means 3E.

Figure 29:
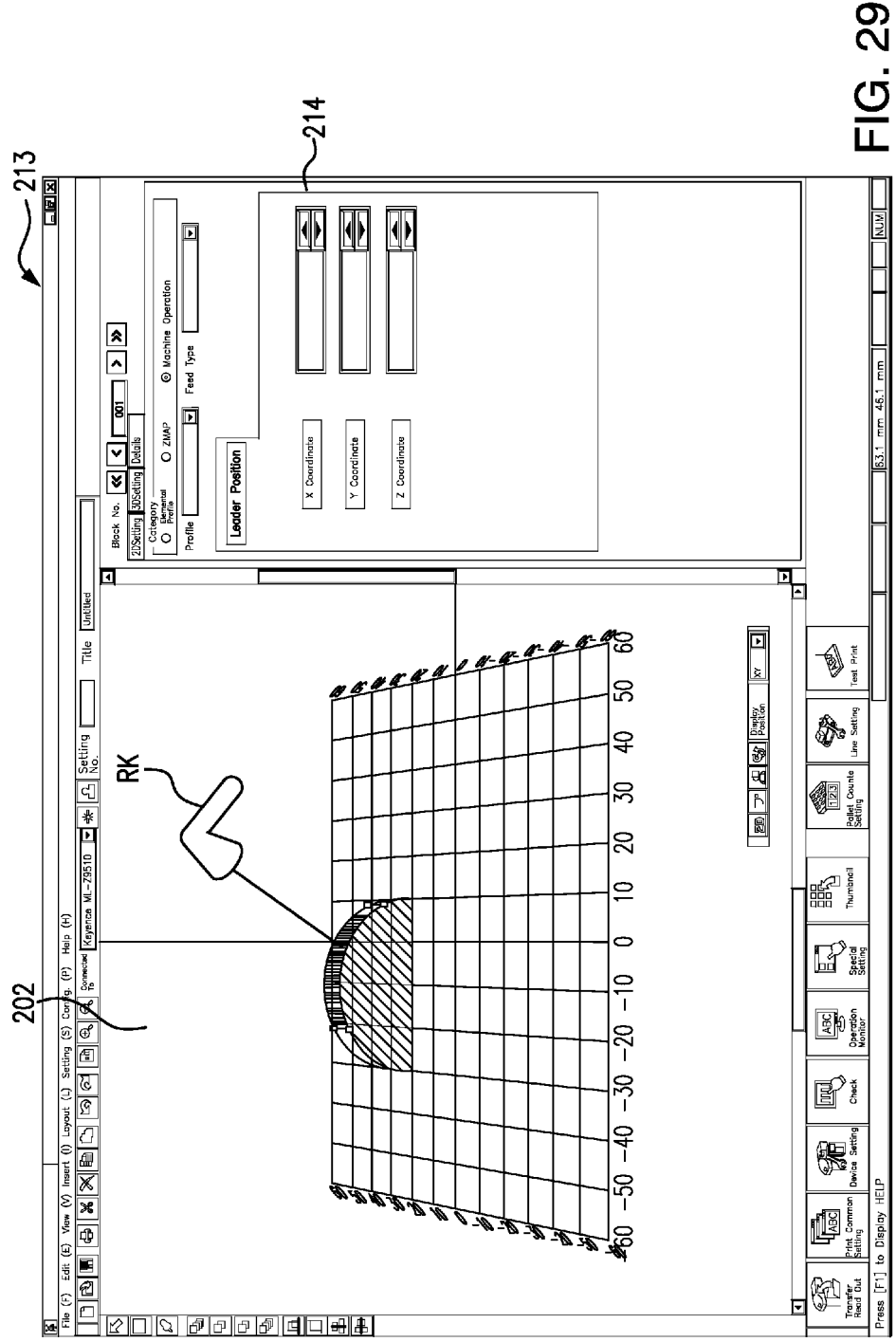
FIG. 29 is a photographic illustration showing a reading direction setting window.

FIG. 29 shows a reading direction setting window 213 for achieving the reading direction adjusting means 3E. The reading direction setting window 213 includes the edit display window 202 and a reading setting dialog box 214. Users are enabled to specify an installation location of the optical reader by X-, Y- and Z-coordinated in the box. It is also practicable to adjust a reading direction of the optical reader by specifying a vector and a line. Otherwise, it is enabled to drag and drop an icon PK representing the optical reader in any position of the edit display window 202 so as thereby to specify a relative position between the optical reader and a work, This manner enables users to locate the optical reader in any desired position easily through visual feeling of a position of the optical reader with resect to the work.

Although, the above description has been directed to a barcode as an example of print pattern, the same is true for two-dimensional codes and other symbols and character strings. Two dimensional codes have timing patterns for a correction of displacement of each cell (dot) occurring due to distortion so as to be easily read when it is printed on a curved surface and, on the other hand, differ in stable readability due to distortions according to code types. However, the stable readability of a tow dimensional code is enhanced by deforming the tow dimensional code according to a curved surface. In this way, in the case of a symbol having a large information capacity, read of the symbol is stably achieved at a high read rate as a result of printing the symbol corrected after distortion correction. The deformed pattern printing is effectively used in the case of direct reading of a character string by an optical reader, and besides in the case of visual recognition of a character string printed on an uneven or irregular work surface.

Figure 30:
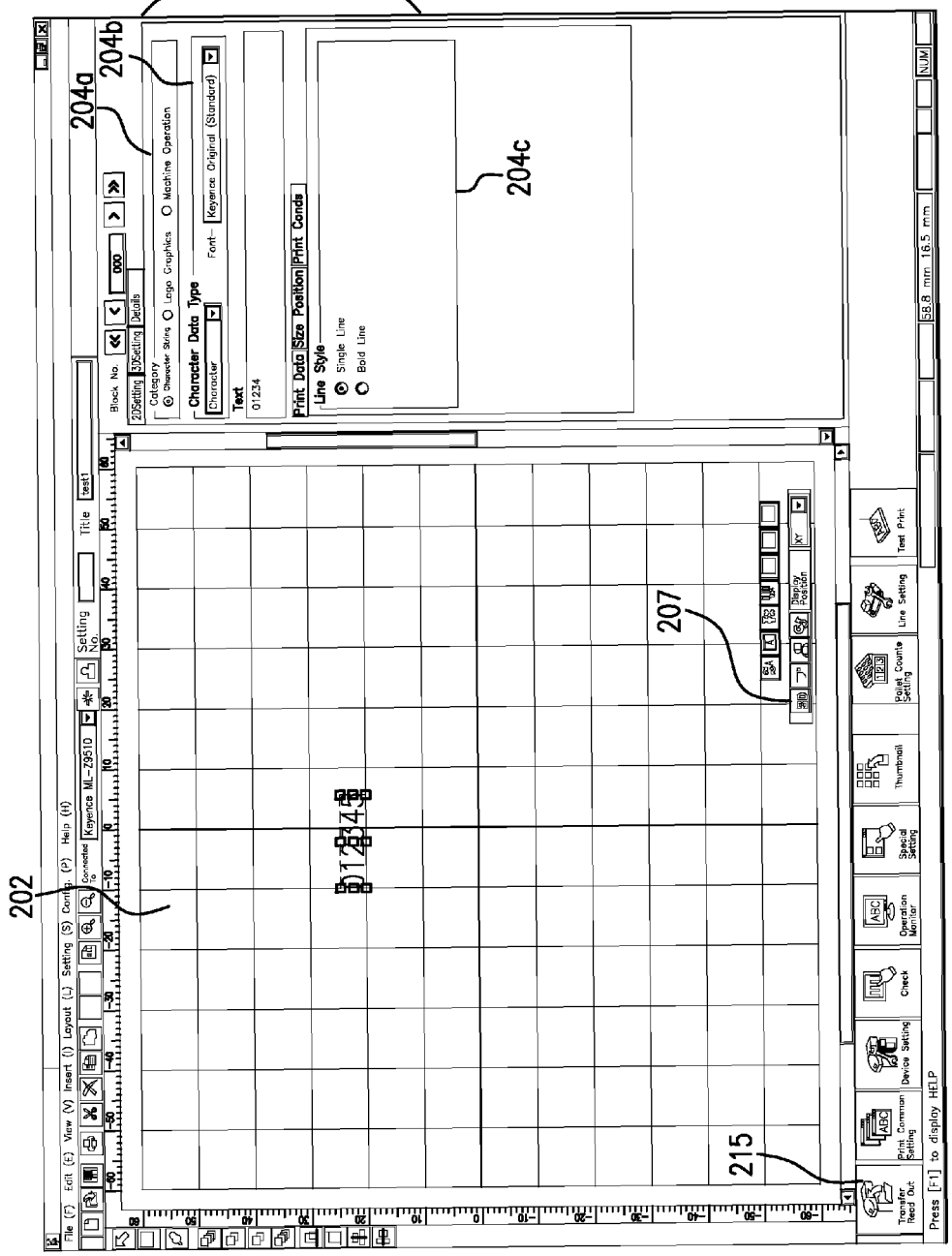
FIG. 30 is a photographic illustration showing a character line setting window.
Figure 31:
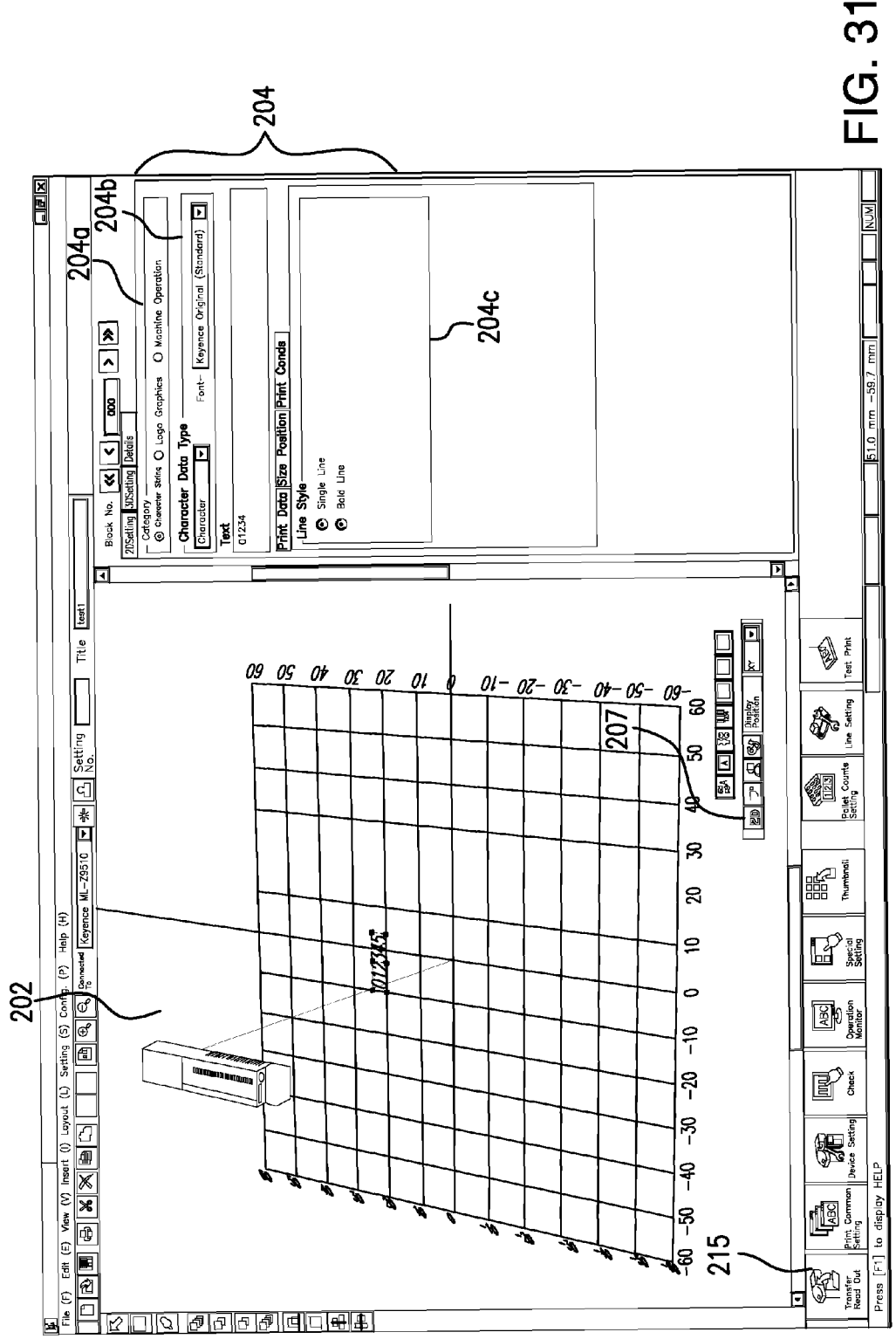
FIG. 31 is a photographic illustration showing the character line setting window in which a character line is displayed.

Referring to FIGS. 30 and 31 illustrating the edit display window and the Print Pattern setting dialog box 204 as the processing pattern input means 3B, the Details setting tab is chosen in the Print Pattern setting dialog box 204 for specifying a print category, characters and a line style. In the Details setting tab, when typing a character string "012345" as a print in the Text box 204b after specifying a character string as a print category in the Print Category box 204a, a character string "012345" appears in the edit display window 202 in two dimensions. At this time, when pressing the view switch button 207A, the edit display window 202 is altered to the 2D view mode to display a three-dimensional representation of the character string "012345" as shown in FIG. 31. Subsequently, if necessary, the character string "012345" is deformed by specifying a reading direction in which the user is enabled to visually recognize an orthogonal projection pattern. Once laser processing data has been acquired in the form of 3D spatial coordinate data, a fine adjustment is made in, for example, layout and the Z-directional position as appropriate. This adjustment may be achieved by the scroll bars or a mouse wheel. The laser processing data thus contemplated in the procedure is transferred to the controller 1A by pressing a Transfer Read Out button 215 in the menu bar at the bottom of the screen. The laser processing system is operated to print the print pattern based on the laser processing data. It is practical to make a proof print for a prior check prior to start full-scale printing operation. The laser processing data may be reset on a check result of the proof print as appropriate. It is practicable to display two or more work surfaces in the edit display window to specify processing patterns for the individual work surfaces.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A laser processing data setting system for setting processing data representing a pattern in which a laser processing system scans a three-dimensional work surface with a laser beam within a working zone to form said pattern readable by an optical reader on said three-dimensional work surface, said laser processing data setting system comprising:
   laser processing condition setting means for setting conditions of laser processing by said laser processing system based on information on characters, a symbol, or both constituting said pattern and a three-dimensional profile of said three-dimensional work surface; and
   data generating means for generating data based on which laser processing system executes laser processing;
   wherein said data generating means converts said data into processing data representing a processing pattern that is an orthogonal projection of said pattern on said three-dimensional work surface based on said conditions of laser processing.

2. The laser processing data setting system as defined in claim 1, wherein an optical axis of said optical reader is aligned with a normal to said three-dimensional work surface.

3. The laser processing data setting system as defined in claim 2, wherein said three-dimensional work surface is column-shaped and said conditions of laser processing includes either one of a curvature radius of said column-shaped three-dimensional work surface and coordinates of a center of a circle as an envelope of said column-shaped three-dimensional work surface.

4. The laser processing data setting system as defined in claim 2, wherein said pattern comprises either one of a barcode and a two-dimensional code.

5. The laser processing data setting system as defined in claim 3, wherein said conditions of laser processing includes scanline density increasing as an angle of a normal to said column-shaped three-dimensional work surface when an optical axis of said optical reader becomes larger.

6. The laser processing data setting system as defined in claim 1, wherein said conditions of laser processing includes an angle of said optical axis with respect to said three-dimensional work surface.

7. The laser processing data setting system as defined in claim 6, wherein said three-dimensional work surface is column-shaped and said conditions of laser processing includes either one of a curvature radius of said column-shaped three-dimensional work surface and coordinates of a center of a circle as an envelope of said column-shaped three-dimensional work surface.

8. The laser processing data setting system as defined in claim 6, wherein said pattern comprises either one of a barcode and a two-dimensional code.

9. The laser processing data setting system as defined in claim 7, wherein said conditions of laser processing includes scanline density increasing as an angle of a normal to said column-shaped three-dimensional work surface when an optical axis of said optical reader becomes larger.

10. The laser processing data setting system as defined in claim 1, wherein said three-dimensional work surface is column-shaped and said conditions of laser processing includes either one of a curvature radius of said column-shaped three-dimensional work surface and coordinates of a center of a circle as an envelope of said column-shaped three-dimensional work surface.

11. The laser processing data setting system as defined in claim 10, wherein said conditions of laser processing includes scanline density increasing as an angle of a normal to said column-shaped three-dimensional work surface when an optical axis of said optical reader becomes larger.

12. The laser processing data setting system as defined in claim 10, wherein said pattern comprises either one of a barcode and a two-dimensional code.

13. The laser processing data setting system as defined in claim 1, wherein said pattern comprises either one of a barcode and a two-dimensional code.

14. A laser processing system for scanning a three-dimensional work surface with a laser beam within a working zone to form a pattern readable by an optical reader on said three-dimensional work surface, said laser processing system comprising:
   laser generating means for generating a laser beam;
   scanning means for scanning said three-dimensional work surface with said laser beam within said working zone which comprises a beam expander having a lens system which includes at least two lenses coaxially at an incident side and an exit side, respectively, for varying a focal length of said laser beam by varying a relative distance between said two lenses, a first scan mirror for deflecting said laser beam coming from said beam expander in a first direction to scan said work surface within said working zone in said first direction, and a second scan mirror for deflecting said laser beam reflected by said first scan mirror in a second direction perpendicular to said first direction to scan said work surface within said working zone in said second direction;
   control means for controlling said laser generating means and said scanning means so as to apply said laser processing to said work surface according to laser processing conditions;
   processing condition setting means means for setting said laser processing conditions by specifying a three-dimensional profile of said work surface and a processing pattern; and
   data generating means for generating laser processing data for said work surface according to said laser processing conditions;
   wherein said data generating means converts said data into processing data representing a processing pattern that is an orthogonal projection of said pattern on said three-dimensional work surface based on said conditions of laser processing.

15. A method of setting processing data representing a pattern in which a laser processing system scans a three-dimensional work surface with a laser beam within a working zone to form said pattern readable by an optical reader on said three-dimensional work surface, said laser processing data setting method comprising the steps of:
   setting conditions of laser processing by said laser processing system based on information on said pattern and a three-dimensional profile of said three-dimensional work surface;
   generating data via data generating means based on which laser processing system executes laser processing; and
   converting said data into processing data representing a processing pattern that is an orthogonal projection of said pattern on said three-dimensional work surface based on said conditions of laser processing.

16. A computer-readable storage medium in which a computer program for setting laser processing data representing a pattern in which a laser processing system scans a three-dimensional work surface with a laser beam within a working zone to form said pattern readable by an optical reader on said three-dimensional work surface is stored, said computer program comprising:
   a function of setting conditions of laser processing by said laser processing system based on information on said pattern and a three-dimensional profile of said three-dimensional work surface;
   a function of generating data via data generating means based on which laser processing system executes laser processing; and
   a function of converting said data into processing data representing a processing pattern that is an orthogonal projection of said pattern on said three-dimensional work surface based on said conditions of laser processing.

* * * * *